United States Patent
Tsai et al.

(10) Patent No.: US 11,283,475 B1
(45) Date of Patent: Mar. 22, 2022

(54) RADIO INTERFERENCE DETECTION AND DYNAMIC CHANNEL BANDWIDTH MANAGEMENT

(71) Applicant: Amazon Technologies, Inc., Seattle, WA (US)

(72) Inventors: Kun Ting Tsai, Fremont, CA (US); Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 16/353,938

(22) Filed: Mar. 14, 2019

(51) Int. Cl.
| | | |
|---|---|---|
| *H04W 8/00* | (2009.01) | |
| *H04W 84/18* | (2009.01) | |
| *H04B 1/10* | (2006.01) | |
| *H04B 17/318* | (2015.01) | |
| *H04W 28/20* | (2009.01) | |
| *H04W 84/12* | (2009.01) | |
| *H04W 88/08* | (2009.01) | |

(52) U.S. Cl.
CPC ......... *H04B 1/1027* (2013.01); *H04B 17/318* (2015.01); *H04W 28/20* (2013.01); *H04B 2001/1054* (2013.01); *H04W 84/12* (2013.01); *H04W 88/08* (2013.01)

(58) Field of Classification Search
CPC .... H04W 84/12; H04W 72/082; H04W 28/08
See application file for complete search history.

(56) References Cited

U.S. PATENT DOCUMENTS

| | | | |
|---|---|---|---|
| 9,380,604 B1* | 6/2016 | Amiri | H04B 17/336 |
| 2016/0073405 A1* | 3/2016 | Khawer | H04L 5/0007 |
| | | | 370/329 |
| 2016/0112145 A1* | 4/2016 | Rezk | H04K 3/822 |
| | | | 455/67.13 |
| 2017/0048728 A1* | 2/2017 | Ngo | H04W 76/15 |
| 2019/0356408 A1* | 11/2019 | Sharp | H04K 3/822 |
| 2020/0068570 A1* | 2/2020 | Khan | H04L 5/0037 |
| 2020/0242922 A1* | 7/2020 | Dulberg | G08G 1/042 |

* cited by examiner

*Primary Examiner* — Romani Ohri
(74) *Attorney, Agent, or Firm* — Lowenstein Sandler LLP

(57) ABSTRACT

A wireless access point device includes a radio to establish a communication link on a first primary channel using a wireless local area network (WLAN) protocol. The communication link has an operating channel bandwidth and a communication link bandwidth that is adjustable to be identical to or lower than the operating channel bandwidth. The operating channel bandwidth includes the first primary channel and a plurality of secondary channels. The WAP device is to determine that received data, which contains in-phase and quadrature (I/Q) values, does not include a valid WLAN frame; determine that a first secondary channel of the plurality of secondary channels has an interference signal signature via application of frequency domain analysis on the I/Q sample values; and modify the communication link bandwidth from a first frequency range to a second width frequency range, which does not include the first secondary channel.

20 Claims, 18 Drawing Sheets

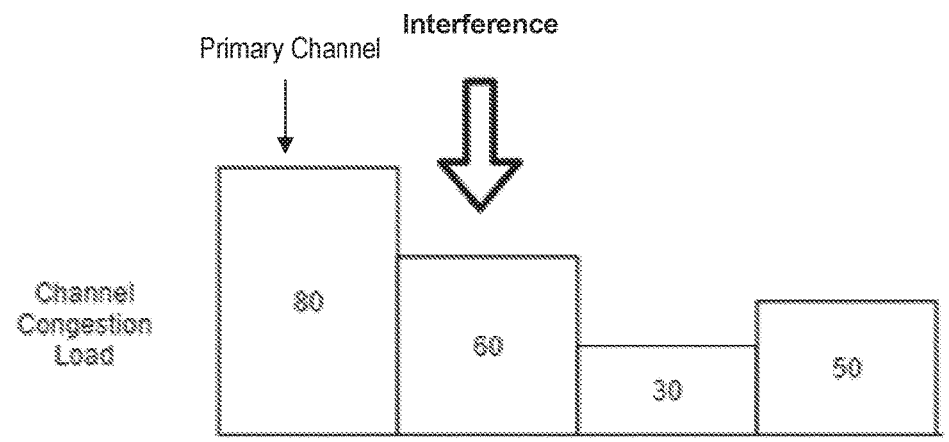
Node 1
FIG. 9A
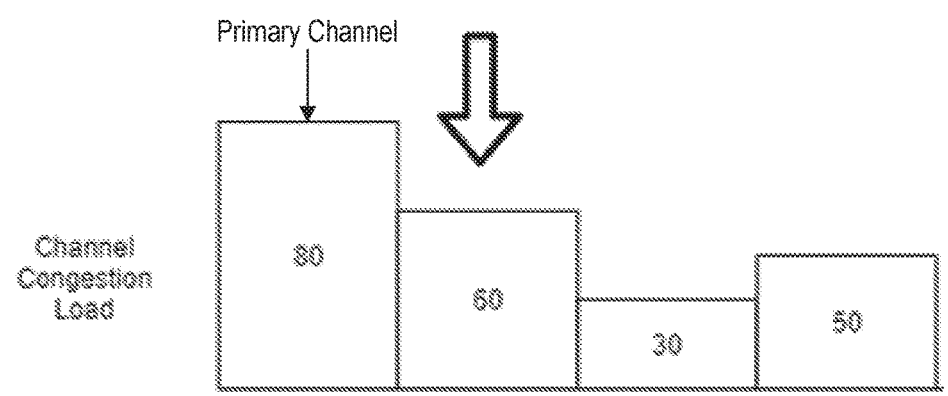
Node 2
FIG. 9B
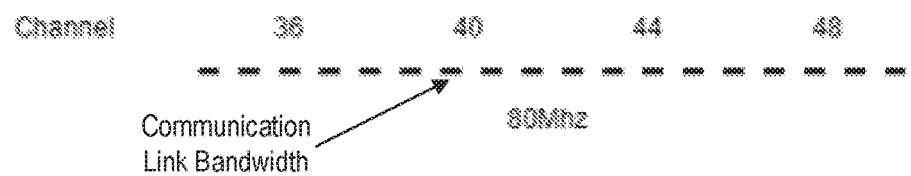

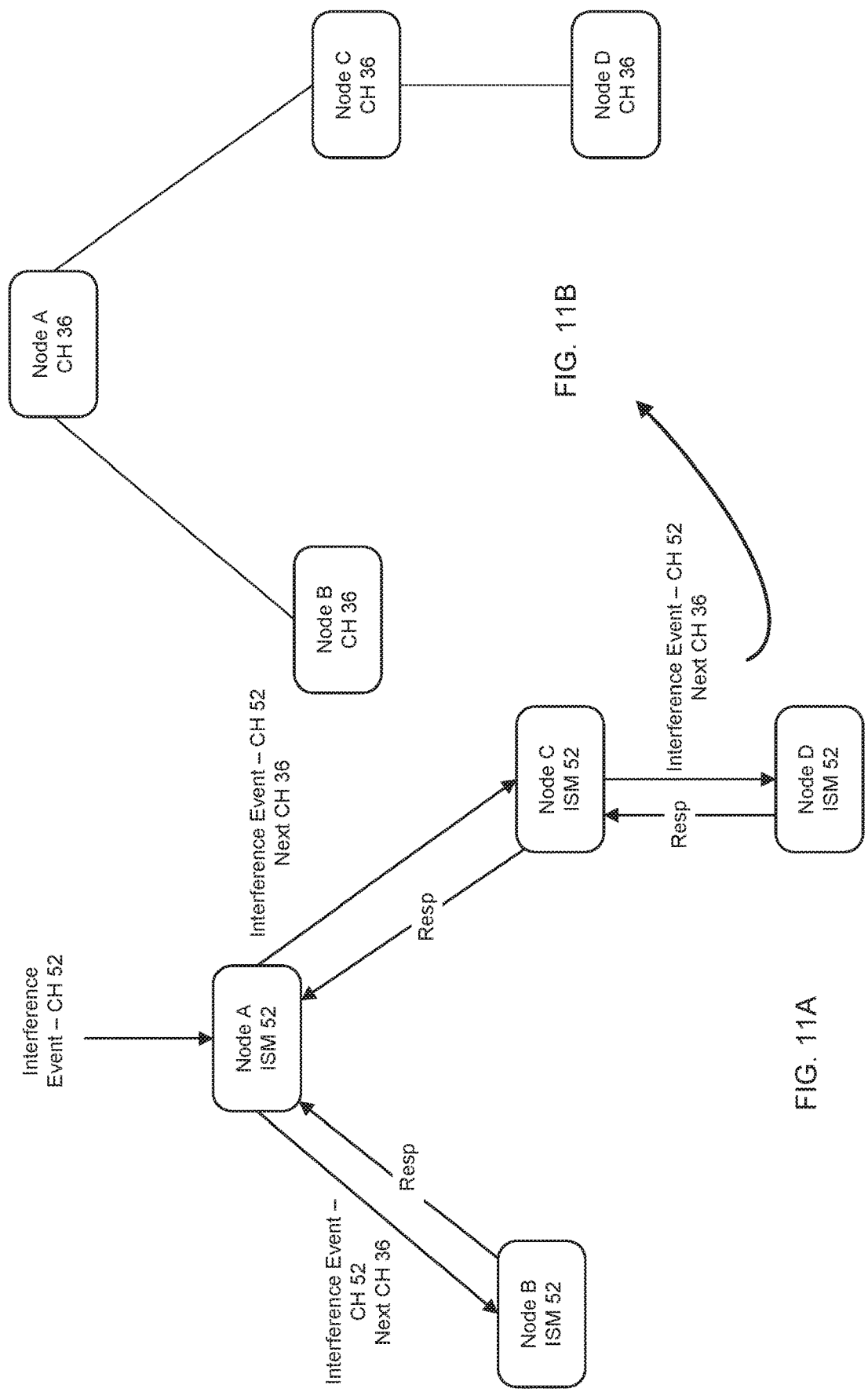

1200

```
┌─────────────────────────────────────┐
│ Establish communication link on a   │──1205
│ first primary channel using WLAN    │
│ protocol.                           │
└─────────────────────────────────────┘
                 │
                 ▼
┌─────────────────────────────────────┐
│ Transmit first data on communication│──1210
│ link with communication link        │
│ bandwidth set to first freq range.  │
└─────────────────────────────────────┘
                 │
                 ▼
┌─────────────────────────────────────┐
│ Receive second data on the          │──1212
│ communication link.                 │
└─────────────────────────────────────┘
                 │
                 ▼
┌─────────────────────────────────────┐
│ Determine that the second data does │──1215
│ not include a valid WLAN frame but  │
│ raw I/Q sample values.              │
└─────────────────────────────────────┘
                 │
                 ▼
┌─────────────────────────────────────┐
│ Determine a first secondary channel │──1220
│ of a plurality of secondary channels│
│ has a radar signature via frequency │
│ domain analysis on the raw I/Q      │
│ sample values.                      │
└─────────────────────────────────────┘
                 │
                 ▼
┌─────────────────────────────────────┐
│ Determine that a second secondary   │──1225
│ channel does not have a radar       │
│ signature.                          │
└─────────────────────────────────────┘
                 │
                 ▼
┌─────────────────────────────────────┐
│ Adjust the communication link       │──1230
│ bandwidth from the first freq. range│
│ to a second ferq. range, which      │
│ includes the second secondary       │
│ channel but excludes the first      │
│ secondary channel.                  │
└─────────────────────────────────────┘
                 │
                 ▼
┌─────────────────────────────────────┐
│ Communicate second data on the      │──1235
│ communication link with the         │
│ communication link bandwidth set to │
│ the second freq. range.             │
└─────────────────────────────────────┘
```

FIG. 12

RADIO INTERFERENCE DETECTION AND DYNAMIC CHANNEL BANDWIDTH MANAGEMENT

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, at least some of these electronic devices communicate through at least one wireless access point (WAP) device. The WAP device, in response to detecting radar on a primary channel, is required to move to another channel, which is disruptive to data traffic and may cause packet loss.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 9A is a graph illustrating channel congestion load and detection of an interference on a first secondary channel of a first WAP device according to an embodiment.

FIG. 9B is a graph illustrating channel congestion load and detection of an interference on the first secondary channel of a second WAP device according to an embodiment.

FIGS. 11A and 11B are a network diagram of multiple WAP devices (nodes) within the WMN that illustrates interference event packet propagation between neighbor WAP devices according to an embodiment.

FIG. 12 is a flow chart of a method for radio interference detection and channel bandwidth management according to an embodiment.

DETAILED DESCRIPTION

Figure 1:
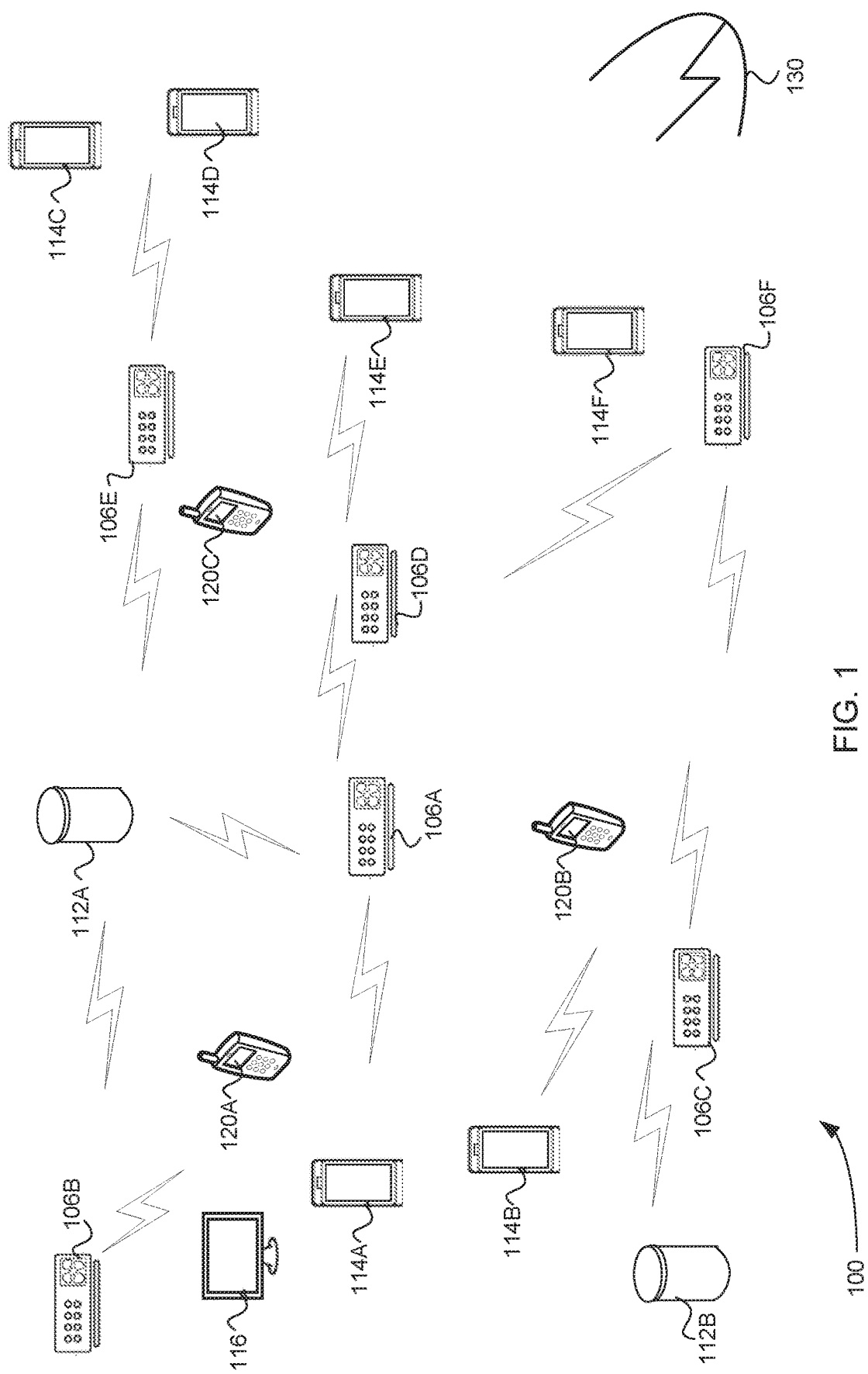
FIG. 1 is a network diagram of wireless access point (WAP) devices of a wireless mesh network (WMN) that provide content distribution to client wireless devices according to one embodiment.

Disclosed embodiments may be applied to wireless mesh networks (WMN), including a variety of WMN throughout the world made up of multiple wireless access point (WAP) devices. Wireless regulatory requirements in certain countries require radios operating on channels in certain frequency bands to perform radar detection and avoid operating on channels where radar signals are detected. This process is referred to as Dynamic Frequency Selection (DFS). For a variety reasons, including efficient operation on primary and secondary channels within a communication link, the avoidance of channels on which interference signal signatures are detected may be employed as an extension to radar avoidance performed by DFS channels. Interference signal signatures may be understood to apply to radar signatures or any interference signal signature that is recognized to not be a wireless local area network (WLAN) protocol data frame within received data. In addition to radar, such interference signal signatures may be indicative of detecting microwaves, cordless phone signals, satellite signals, and the like.

In many countries, regulatory requirements may limit the available number of 5 GHz channels or place additional restrictions on their use because the spectrum is shared with other technologies and services. For instance, in the United States and other countries, some of the Unlicensed National Information Infrastructure (U-NII) bands are used by radar systems, e.g., 5.25 GHz to 5.35 GHz and 5.47 GHz to 5.725 GHz. Radar systems are deployed by, for example, federal civilian organizations, specific civilian industrial industries (such as weather, medical), and military organizations. Networks operating using the Wi-Fi® network technology in those bands are required to employ a radar detection and avoidance capability. The IEEE 802.11h standard addresses this requirement by adding support for DFS and Transmit Power Control (TPC) on DFS channels. Such capability is not required on non-DFS channels. The IEEE 802.11h standard provides DFS and TPC to the 802.11a physical layer (PHY), and has been integrated within the full IEEE 802.11-2007 standard.

Furthermore, U-NII devices (such as the WAP devices discussed herein) are to employ a DFS radar detection mechanism to detect the presence of radar system and to avoid co-channel operation with those radar systems. The minimum DFS detection threshold for devices with a maximum equivalent isotropically radiated power (ERIP) of 200 milliwatt (mW) to 1 W is −64 decibel-milliwatts (dBm). For devices that operate with less than 200 mW ERIP, the minimum detection threshold is −62 dBm. This interference detection threshold is the received power averaged over one microsecond referenced to a 0 dBi antenna. The DFS process is to further provide a uniform spreading of the loading over all available channels.

Herein, when a WAP device detects a radar event, the radar signals that are detected meet the interference detection threshold. Radar systems generate radar signals that are either continuous or pulsed. With the advancement in radar technology, pulsed radar is more common, which usually are detectable as having a particular pulse pattern. In one embodiment, the pulses of the pulse pattern of a radar event are about one microsecond long and are spaced by 100 microsecond delays, although other types and durations of pulse patterns are envisioned. The WAP devices discussed herein may be capable of detecting different types of radar as a radar event, and may further detect other interferences as an interference event when received data is recognized as other than an IEEE 802.11 protocol.

In various embodiments, DFS functionality is further integrated within at least some of the WAP devices of the WMN. If a WAP device is designated as a master (e.g., a master owner), the WAP device is to lose its operating channel upon detecting a radar event. This master WAP device may employ a radar interference detection function to detect the radar event, where the detection function is governed by the interference detection threshold and other pulse pattern detection capability. The master WAP device may initiate an unlicensed U-NII network by transmitting control signals that will enable other unlicensed U-NII devices to associate (participate in a wireless network) with the master WAP device. Further, a second WAP device may be designated as a slave when the second WAP device joins in and participates in the wireless network initiated by master WAP device.

Before initiating a network on a channel, the master WAP device is to perform a channel availability check (CAC) for a certain duration (such as for a minute) to ensure that there is no radar operating on the channel. During normal operation, the master WAP device is to monitor the operation channel to ensure that there are no radar signals operating on the channel, which is referred to as in-service monitoring (ISM). If the master WAP device detects a radar signal during ISM, the operating channel of the unlicensed U-NII network is made unavailable. In response, the master WAP device stops transmitting on the radio associated with the channel and instructs (e.g., signals) associated client wireless devices to also stop transmitting on the channel. The master WAP device and associated client wireless devices are to vacate the channel within a channel change time, e.g., 10 seconds in one embodiment, although other change times are envisioned. The aggregate transmission during the channel change time is to be limited to a channel closing transmission time, e.g., 260 ms in one embodiment.

Devices on the market today operate over an operating channel bandwidth, which defines a maximum allowable frequency range under the IEEE 802.11 protocols. The devices, however, may communicate within a communication link over a subset of the operating channel bandwidth, also referred to as a communication link bandwidth. Because these devices have their operating channel bandwidth and communication link bandwidth tied together (e.g., they are identical), when a primary DFS channel within the communication link bandwidth of a communication link detects radar signals, DFS requires the radio to vacate the entire operating channel bandwidth to switch to a new DFS channel. This change is required regardless of the fact that other DFS channels within the communication channel bandwidth may be communicating fine without detecting the radar signals detected on the primary DFS channel.

Under heavy traffic load, the longer it takes to change to a new channel the more packet losses a communication link may observe. The maximum delay and packet losses that can occur upon such channel change event includes at least: time overhead to pause traffic, time for channel change (in the case of new channel being DFS, additional time to perform CAC), and unpausing the traffic in the new channel. In the scenarios like live streaming flowing over a DFS channel, the user quality of service degrades severely upon such a channel change event.

The present embodiments obviate the need in most cases to change channels in response to detecting an interference signal signature (such as a radar event) on a particular channel within a communication link between WAP devices. In one embodiment, a radio of a WAP device establishes the communication link on a first primary channel using a WLAN protocol (such as an IEEE 802.11 protocol), the communication link having an operating channel bandwidth and a communication link bandwidth. The operating channel bandwidth may be fixed at a maximum channel bandwidth (e.g., a wide spectrum of up to 160 MHz) allowed by the WLAN protocol for receiving data within the first primary channel and multiple secondary channels. In one embodiment, each of these channels is a 20 MHz channel. Further, the communication link bandwidth may be set to a first frequency range and is adjustable by the radio to be identical to or lower than the operating channel bandwidth. Thus, the communication link bandwidth may be as low as 20 MHz to as high as 160 MHz, assuming 160 MHz is the maximum channel bandwidth, although these numbers are adjustable in different embodiments.

Accordingly, in various embodiments, when the radio detects an interference signal signature on one of the secondary channels (e.g., a first secondary channel), the radio dynamically adjusts the communication link bandwidth from the first frequency range to a second frequency range, where the second frequency range excludes the first secondary channel. Because the radio continues to receive data on the multiple secondary channels in addition to the primary channel, the radio may detect an interference signal signature and determine which secondary channel is impacted in order to adjust the communication link bandwidth to eliminate that secondary channel. Similarly, via continual monitoring of data received on the excluded first secondary channel, the radio may dynamically expand the communication link bandwidth to again include the first secondary channel upon detecting receipt of a valid WLAN frame in data received on the first secondary channel.

In this way, DFS requirements are met and the primary channel does not have to be changed, thus reducing channel switch overhead. If, however, an interference signal signature is detected on the primary channel, then the radio may both reduce the communication link bandwidth to exclude the primary channel, and designate one of the multiple secondary channels, which are known to not have interference signals, as the primary channel. The designation may be performed via tuning data transmission to the new primary channel. In the case of a radar signature, a CAC may still be performed to confirm that the secondary channel to which the primary channel is to be moved is clear of radar signals. Further, upon detection that a valid WLAN frame is received in data on the excluded primary channel, the radio may move the primary channel back to the original (or home) primary channel.

In various additional or alternative embodiments, the disclosed WAP devices communicate with a cluster server for purposes of being directed as to dynamic communication link bandwidth adjustments and to determine a next channel to designate as the primary channel if the need arises to move away from the primary channel. For example, a first WAP device may transmit, to the cluster server, information including at least one of historic interference event data, channel congestion data, or application-based latency requirements associated with the multiple secondary channels. The cluster server may already have cluster topology information about the WAP devices, and know which WAP devices are nearby, e.g., adjacent to each other. The cluster server may then develop one or both of a bandwidth selection priority list and a primary channel priority list for each WAP device. For adjacent WAP devices, these lists may be similar, but may also differ depending on levels of channel congestion and application-based latency requirements where a first WAP device may prioritize a channel differently than a second WAP device.

In these embodiments, the first WAP device may receive, from the cluster server, the bandwidth selection priority list based on the information the first WAP device has been transmitting to the cluster server. The first WAP device may further establish a communication link bandwidth with a first frequency range that is identical to or lower than the operating channel bandwidth and that is consistent with the bandwidth selection priority list received from the cluster server. The first WAP device may further transmit data on the communication link with the communication link bandwidth set to the first frequency range. In the case of detecting an interference signal signature on one of the secondary channels within the communication link bandwidth, the first WAP device may dynamically adjust the communication link bandwidth to a second frequency range, e.g., that may be listed high in the bandwidth selection priority list and that excludes the secondary channel on which the interference signal signature is detected.

FIG. 1 is a network diagram of wireless access point (WAP) devices of a wireless mesh network (WMN) 100 that provide content distribution to client wireless devices according to one embodiment. The WAP devices may include, for purposes of explanation, a first WAP device 106A, a second WAP device 106B, a third WAP device 106C, a fourth WAP device 106D, a fifth WAP device 106E, and a sixth WAP device 106F, distributed throughout the WMN 100 and to provide wireless (e.g., network and Internet) connection to the client wireless devices. The WAP devices may include mesh link devices such as peer-to-peer mesh link devices, a backbone mesh link device, or the like. The client wireless devices may include, for example, first wireless client devices 112A, 112B (e.g., Echo® device or Amazon Instant Video (AIV) client), second wireless client devices 114A, 114B, 114C, 114D, 114E, 114F (e.g., AIV client), and a third client wireless device 116 (e.g., a Fire TV device).

In embodiments, each of the client wireless devices may generally wireless connect to the closest WAP device of the multiple WAP devices, and the WAP devices may wirelessly connect to each other or to a portion of the network backbone of the WMN 100. For example, the second WAP device 106B and the third WAP device 106C may connect to the first WAP device 106A. The fourth WAP device 106D may also connect to the first WAP device 106A, or vice versa. Further, the fifth WAP device 106E and the sixth WAP device 106F may connect to the fifth WAP device 106D. In one embodiment, the first WAP device 106A may connect to the network backbone.

In various embodiments, the WMN 100 may be exposed to an interference source 130 such as microwave, satellite, radar signals, and the like. Microwave signals may be generated by microwave ovens or medical equipment. Radar signals may be generated by an airport, a weather station, a medical facility, or a military base, for example. The WMN 100 may further be exposed to wireless signals coming from cordless phone 120A, 120B, and 120C, for example. The radios of the WAP devices may be adapted to detect interference signal signatures on in-phase and quadrature (I/Q) sample values (such as Fast Fourier transfer (FFT) values) received on the multiple channels of a communication link bandwidth, and dynamically adjust the communication link bandwidth to exclude such channels.

Figure 2A:
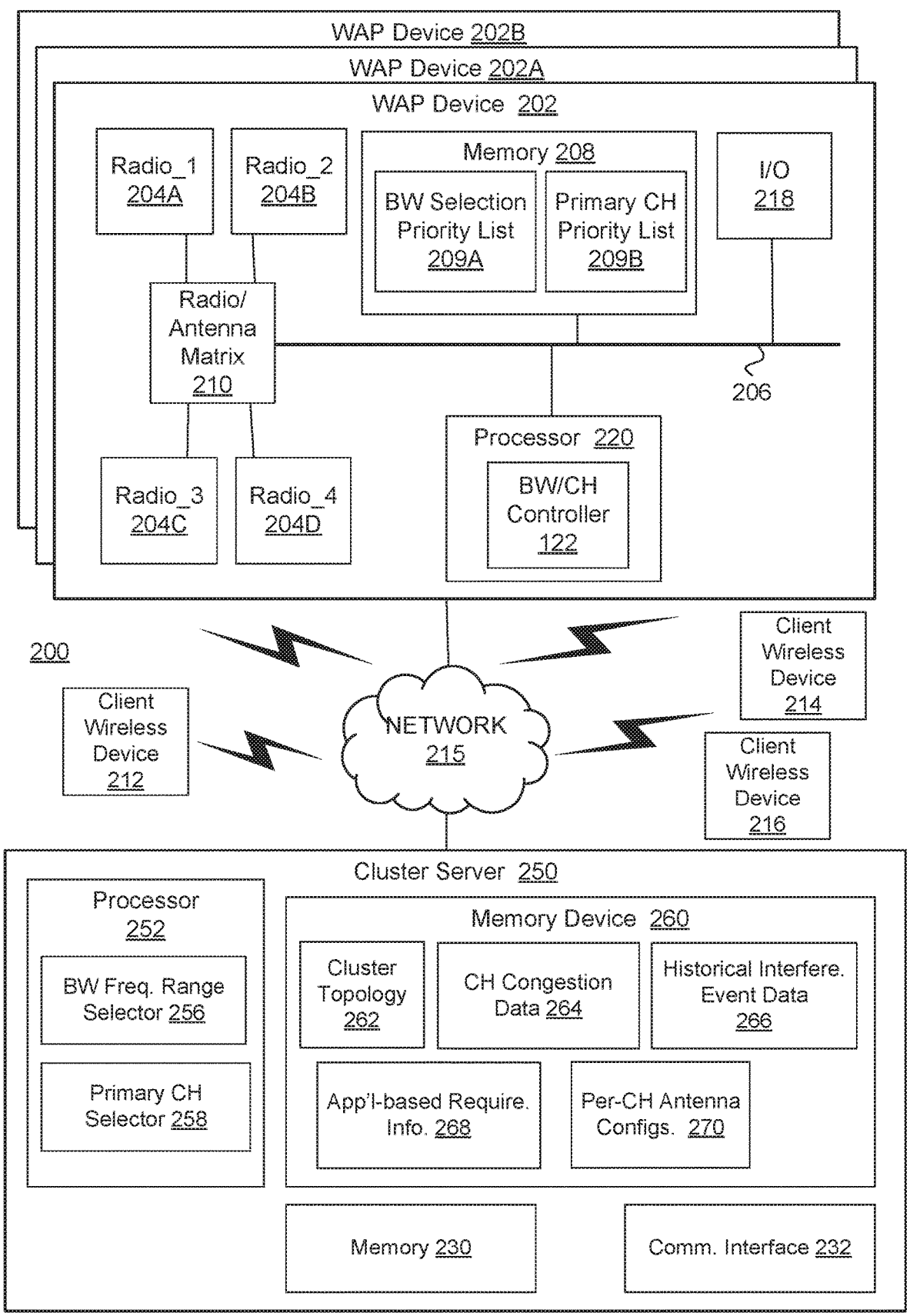
FIGS. 2A, 2B, and 2C are block diagrams of a system for radio interference detection and dynamic channel bandwidth management of the WAP devices according to various embodiments.
Figure 2B:
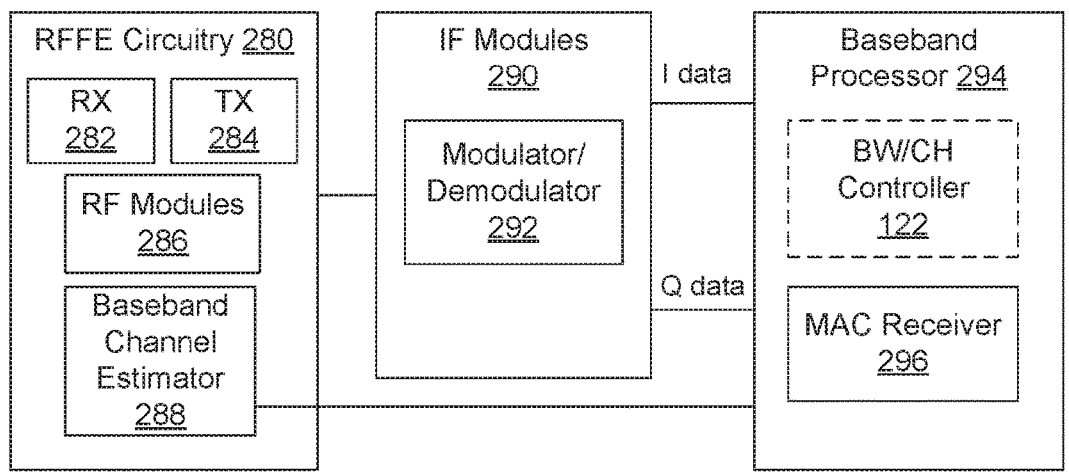
Figure 2C:
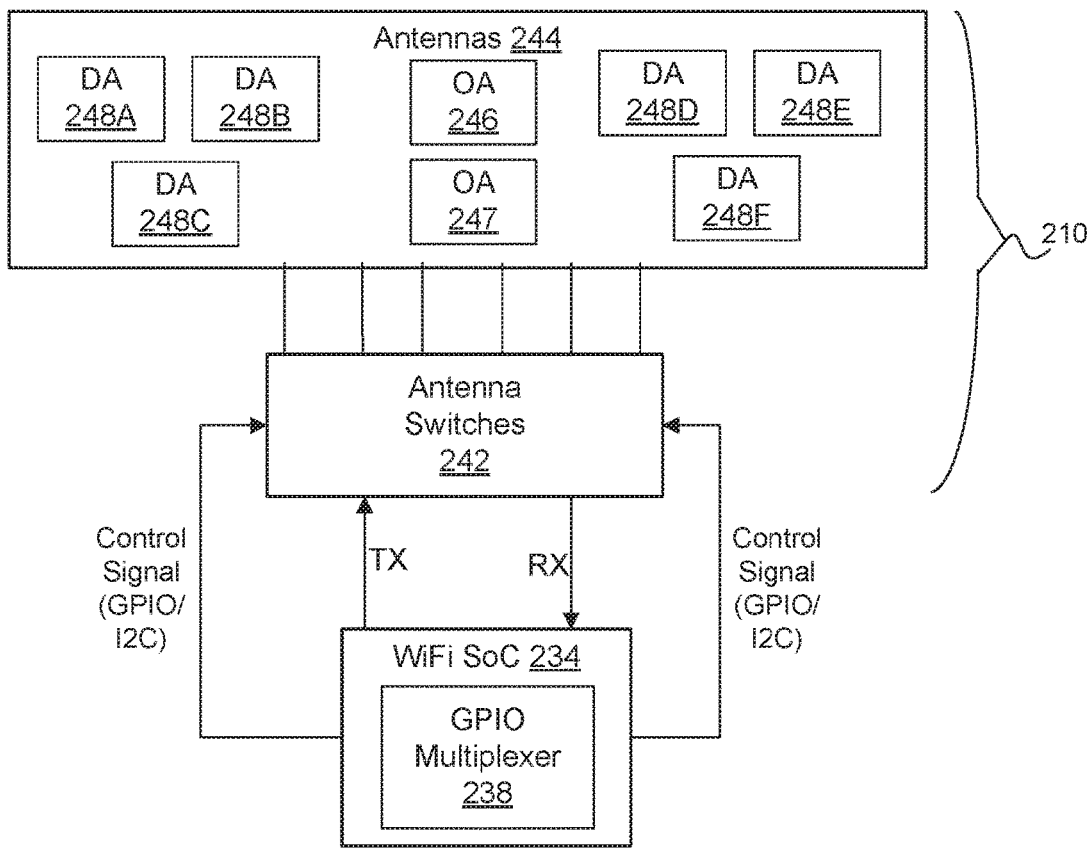

FIGS. 2A, 2B, and 2C are block diagrams of a system 200 for radio interference detection and dynamic channel bandwidth management of the WAP devices according to various embodiments. The system 200 may include a first WAP device 202, a second WAP device 202A, and a third WAP device 202B, to be representative of the multiple WAP devices illustrated in FIG. 1 and which may be located adjacent to each other. While the first WAP device 202 will be discussed in more detail, the first WAP device 202 is also representative of others of the multiple WAP devices discussed herein throughout the various Figures. The system 200 may further include a first client wireless device 212, a second client wireless device 214, and a third client wireless device 216 that are representative of the client wireless devices of FIG. 1. These client wireless devices 212, 214, and 216 increasingly fill up homes and buildings sometimes move throughout the day or night.

In various embodiments, the first WAP device 202 is a WAP device that connects directly to a wired local area network (LAN) and provides wireless connections using wireless LAN technology, such as the Wi-Fi® technology, for other devices to use that wired connection. The first WAP device 202 may be an electronic device that implements the 2.4 GHz access point (AP) and a 5 GHz access point (AP) integrated in the same device. Furthermore, one or more wireless APs of the first WAP device 202 may be implemented by processing logic including hardware, software, firmware, or any combination thereof. It should also be noted that the electronic device may also include additional radios to one or more WLAN radios used to implement the one or more APs, such as wireless personal area network (WPAN) radios, wireless wide area network (WAN) radios, a global position system (GPS) device, and the like.

In the embodiments, the first WAP device 202 includes multiple radios, e.g., a first radio 204A, a second radio 204B, a third radio 204C, and a fourth radio 204D, although more or fewer radios are envisioned in other embodiments coupled to a radio/antenna matrix 210. As will be discussed in more detail with reference to FIG. 2C, the radio/antenna matrix 210 may include at least one omnidirectional antenna, multiple directional antennas, and antenna switches. The first WAP device 202 may further include memory 208 to store a bandwidth selection priority list 209A and a primary channel priority list 209B, among other data, one or more input/output devices 218, and a processor 220 (or other processing device).

Figure 3:
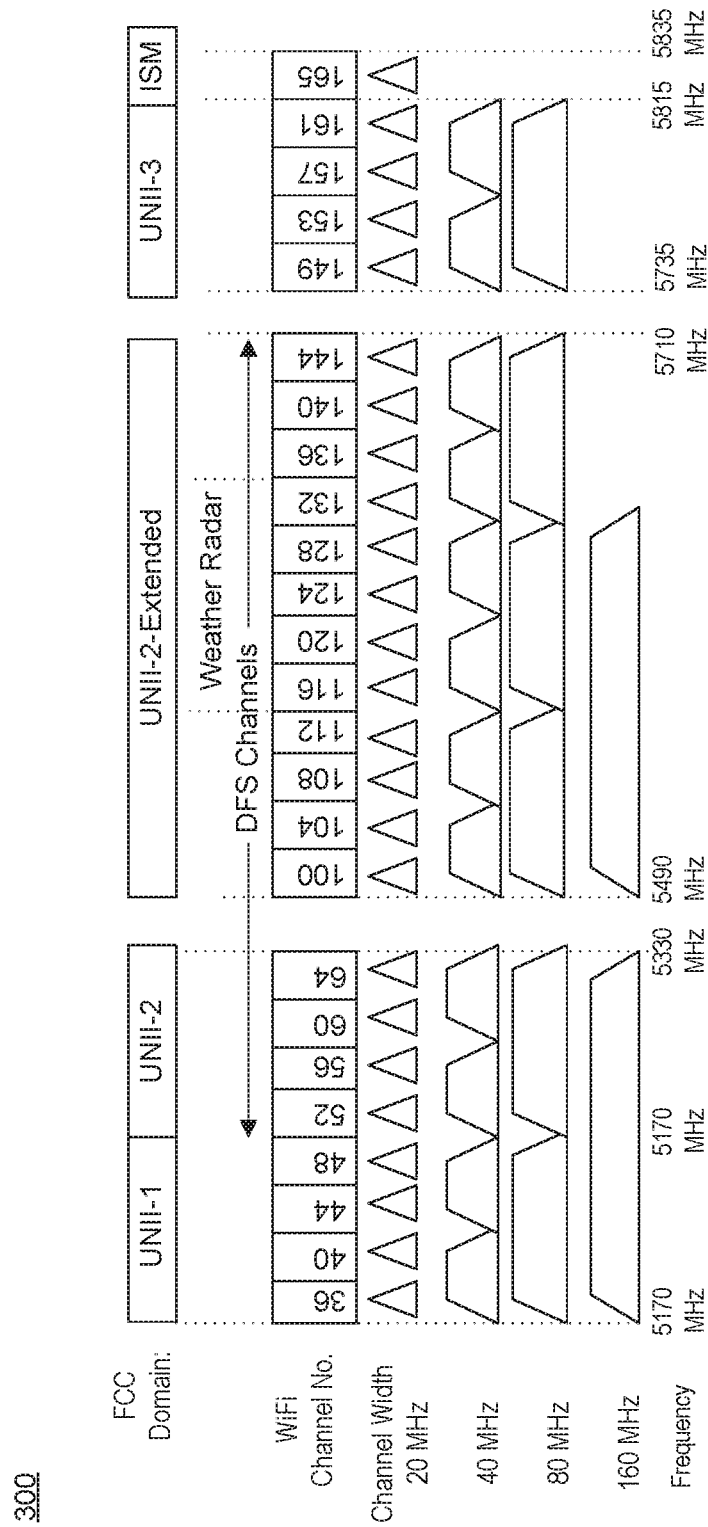
FIG. 3 is a graph that illustrates channel allocation by radios under a wireless local area network (WLAN) protocol according to an embodiment.

The bandwidth selection priority list 209A, as illustrated in Table 1 by way of example, may contain a list of channels definable within a communication channel link and that may be grouped in different bandwidth ranges according to priority. The priority may be determined by analyzing historical interferences detected on the channels, channel congestion data, and application-based throughput and latency requirements associated with the channels, among other criteria. The lists of frequency bandwidths and channels within the bandwidth selection priority list 209A may contain many more than those listed in Table 1, which merely lists a few examples. FIG. 3 illustrates frequency band, channel, and bandwidth information that will inform the data seen in Table 1. The bandwidth selection priority list 209A may be representative of any data structure capable of storing the list of bandwidth range priorities, such as illustrated in Table 1, and that allows cross-referencing of the bandwidth ranges within a given priority to the associated channels.

TABLE 1

| Priority | Bandwidth (BW) Range | WiFi® Channels (CH) |
|---|---|---|
| 1 | 5490 MHz to 5650 MHz | 100, 104, 108, 112, 116, 120, 124, 128 |
| 2 | 5490 MHz to 5610 MHz | 100, 104, 108, 112, 116, 120 |
| 3 | 5490 MHz to 5570 MHz | 100, 104, 108, 112 |
| 4 | 5490 MHz to 5530 MHz | 100, 104 |
| 5 | 5530 MHz to 5650 MHz | 108, 112, 116, 120, 124, 128 |
| 6 | 5570 MHz to 5650 MHz | 116, 120, 124, 128 |

In embodiments, the primary channel priority list 209B is representative of any data structure capable of storing a list of channels that are ordered according to a priority of a next primary channel to which to jump in response to an interference event on the current primary channel. A primary channel on a radio is to transmit data in the form of messages and performs the measurement control exchanges with a cluster server 250 over a network 215 (e.g., a WLAN protocol-based network), with the client wireless devices, and with other WAP devices. In this way, the primary channel may be thought of as the procedural and data coordinator in terms of network connectivity and communication throughout at least a cluster of the WMN 100.

As per Table 2, the primary channel priority list 209B indexes, against the list of channels, which WAP device is the master of the channel and a radio to operate on that channel. The primary channel priority list 209B may optionally further identify an antenna to be coupled to the radio. For example, the antenna may be a particular directional antenna (DA) or an omnidirectional antenna (OA), which is associated with that channel at least for purposes of connecting two wireless devices. The primary channel priority list 209B may be received, by respective WAP devices, from the cluster server 250, e.g., a cloud computing device such as a cloud server. The WAP devices may further transmit the primary channel priority list 209B to the client wireless devices 212, 214, 216 to be stored at the client wireless devices. In this way, the client wireless devices 212, 214, 216 may quickly transition to the next channel in the ordered list of channels of the primary channel priority list 209B in response to an interference detection signal from the first WAP device 202, e.g., an originator node.

TABLE 2

| Channel No. | Master Owner | Radio | Antenna |
|---|---|---|---|
| 1 | WAP device 1 | A | DA_1 |
| 2 | WAP device 2 | B | DA_2 |
| 3 | WAP device 1 | D | OA_5 |

According to one embodiment, the first WAP device 202 is wirelessly coupled to the second WAP device 202B and a third WAP device 202C of the multiple WAP devices, e.g., on a first primary channel (e.g., channel one). Each of the second and third WAP devices is to store the primary channel priority list 209B in which a second primary channel (e.g., channel two) is listed sequentially as a next channel. This second primary channel may or may not be a DFS channel, and if a non-DFS channel, need not perform CAC in response to the an interference event that indicates radar signal detection. Each of the second and third WAP devices may then, in response to the interference event, receive, from the first WAP device, a notice indicative of the interference event and, in response to the notice, change to the second primary channel over which to communicate with the first WAP device. In the alternative, if the second and third WAP devices also detect the interference event on the first primary channel, they may automatically change to the next primary channel in the primary channel priority list 209B. In this way, the second and third WAP devices may converge on the next primary channel (e.g., the second channel) much quicker than having to confirm the next primary channel within a radar event packet (REP) or the like for other interference received from the first WAP device.

The processor 220 may also use the data structure to configure and re-configure the radio/antenna matrix 210 to define a particular path to a particular antenna. As described herein, the radio/antenna matrix 210 can be re-configured for transmission and reception of data on a per-frame basis or at least on a per-channel basis. These components may all be coupled to a communications bus 206 of the first WAP device 202.

In embodiments, the processor 220 may further include a bandwidth (BW)/channel (CH) controller 122 to dynamically adjust the communication link bandwidth of a communication link, e.g., in accordance with the bandwidth selection priority list 209A and in response to detecting an interference signal signature on one of multiple channels of the communication link bandwidth. The BW/CH controller 122 may further dynamically select, from the primary channel priority list 209B, a new primary channel in response to detecting that the current primary channel has an interference signal signature (such as a radar signature). The BW/CH controller 122 may further control the radio/antenna matrix 210 to selectively couple the correct antenna to the correct radio on which will operate the current primary channel according to the primary channel priority list 209B.

In embodiments, the BW/CH controller 222 includes processing logic that may comprise hardware (e.g., circuitry, dedicated logic, programmable logic, microcode, etc.), software (such as instructions running on the processor), firmware or a combination thereof. In some embodiments, one or more of the client wireless devices 212, 214, 216 may be built with the same or similar components as the first WAP device 202. Furthermore, each baseband processor (see FIG. 2B) of a radio may include the BW/CH controller 122 or function in concert with the BW/CH controller 122 resident in the processor 220 resident outside of the radios.

The first WAP device 202 may connect to the network 215 and communicate with the cluster server 250. In various embodiments, the cluster server 250 may include memory 230, a communication interface 232, a processor 252, and a memory device 260. The communication interface 232, which may include one or more network devices for connecting to the Internet, may be adapted to also wirelessly couple the cluster server 250 to the multiple WAP devices 202, 202A, 202B, and to receive data from the multiple WAP devices. The data received from the multiple WAP devices 202, 202A, and 202B may include, for example, cluster topology information, such as node location, historical interference event data (e.g., which WAP devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple WAP devices communicate. The received data may further include information associated with, or useable to determine, pattern recognition and learning associated with radar event detection, data bandwidth requirements, and latency requirements, and the like.

In embodiments, the memory device 260 includes data stored, which are related to channels of the WAP devices and associated with cluster topology information 262 of the WMN 100, channel congestion data 264, historical interference event data 266, historical application-based requirements information 268 (e.g., historical application-based throughput and latency requirements), and per-channel antenna configurations 269, as these terms were discussed previously, and will be discussed in more detail. The network 215 may be representative of an Internet or WAN connection. Such an Internet or WAN connection may include additional links or trunks, whether wired or wireless, that may involve other types of wideband communication, including those based on cellular standard(s).

In various embodiments, the processor 252 (e.g., processing device) includes a bandwidth frequency range selector 256, which is to develop the bandwidth selection priority list 209A for the various WAP devices, and a primary channel selector 258, which is to develop the primary channel priority list 209B for the various WAP devices. The bandwidth frequency range selector 256 may develop the bandwidth selection priority list 209A based on the data stored in the memory device 260, and particularly in coordinating bandwidth range priorities to coincide with channels that may have higher application service level requirements of throughput or lower application service level requirements for latency. In one example, therefore, widths of the communication link bandwidth may be prioritize to include channels that historically serve streaming media such as serving Echo® devices or AIV client devices. The priorities of the bandwidth ranges within the bandwidth selection priority list 209A may also be set in a way that coordinates with preserving the highest prioritized primary channels within the primary channel priority list 209B for adjacent (or nearby) WAP devices.

Furthermore, the primary channel selector 258 may develop the primary channel priority list 209B based on the data stored in the memory device 260, and particularly in view of the cluster topology information 262, the channel congestion data 264, and the historical interference event data 266. Use of this information will allow the primary channel selector 258 to prioritize channels as primary channels that have fewer numbers historical interference detections, that historically have less channel congestion, and/or that coincide with priorities developed for channels of an adjacent WAP device.

With additional reference to FIG. 2B, the first radio 204A, which is representative of each such radio of the first WAP device 202, may include a radio frequency front end (RFFE) circuitry 280, intermediate frequency (IF) modules 290, and a baseband processor 294. The RFFE circuitry 280 may further include a receiver (RX) 284 and a transmitter (TX) 284, a set of radio frequency (RF) modules 286, and a baseband channel estimator 290. The IF modules 290 may include a modulator/demodulator 292, and the baseband processor 294 may further include a medium access control (MAC) receiver 296 and optionally the BW/CH controller 122 that was previously discussed.

In embodiments, one of the RF modules 286 may include a Wi-Fi® physical layer (PHY) at which the RF energy of received RF signals may be measured for purposes of received signal strength information (RSSI), e.g., from the client wireless devices 212, 214, 216, and PHY rate of data streaming. The baseband channel estimator 290, by virtue of being incorporated within the RFFE circuitry 280, may be coupled to the radio/antenna matrix 210, the RX 284, and to the TX 285, and be adapted to estimate channel state information (CSI) or the RSSI for each channel. The CSI may include a detailed channel impulse response with both amplitude and phase information across all the Orthogonal Frequency Division Multiplexing (OFDM) subcarriers and be updated (at the maximum rate) every OFDM symbol. The baseband processor 294 may therefore analyze the CSI data to passively determine signal strength from the client wireless device 212, 214, 216 and/or other WAP devices. The RSSI and CSI data may be received by the baseband processor 294 and integrated within decisions about communication link bandwidth adjustments and primary channel selections, as will be discussed in more detail.

In embodiments, the IF modules 290 may receive data in intermediate frequency form and further process the data signals, including via demodulation by the modulator/demodulator 292, to generate in-phase (I) and quadrature (Q) data, e.g., raw I/Q sample values via sampling the received data. The baseband processor 294 may process the raw I/Q sample values of incoming data received by the radio 204A, e.g., via application of frequency domain analysis on the I/Q sample values to determine whether an interference signal signature has been detected on a channel within the operating channel bandwidth of a communication link.

With additional reference to FIG. 2C, the radio/antenna matrix 210 includes multiple antennas 244 and antenna switches 242, according to various embodiments. The antennas 244 may include a first omnidirectional antenna 246, a second omnidirectional antenna 247 (and optionally additional omnidirectional antennas), a first directional antenna 248A, a second directional antenna 248B, a third directional antenna 248C, a fourth directional antenna 248D, a fifth directional antenna 248E, and a sixth directional antenna 248F, and optionally additional directional antennas. The antennas 244 can direct high gain signals to multiple client wireless devices to achieve high downlink throughput without sacrificing uplink signal reception. To do so, each of the antennas 244 may be selectively coupled, via the antenna switches 242, to a radio to either transmit or receive data, or to both transmit and receive data, during any given frame of multiple frames of streaming data. Each of the antenna switches 242 may be a single switch between a radio (e.g., one of the radios 204A, 204B, 204C, or 204D) and all of the antennas 244. As a number of the antennas 244 increases, some of the antenna switches 242 may need to be cascaded or to selectively couple each of the radios to many antennas that are selectively coupled to a cascaded series of switches.

Related to embodiments, additional disclosure regarding selective choice of antennas for a particular channel is disclosed in U.S. patent application Ser. No. 16/250,315, titled "Multi-Mode Dynamic Frequency Selection System," filed Jan. 17, 2019, which is herein incorporated by this reference in its entirety. The ability to communication over multiple channels with different radio/antenna combinations makes the WAP devices herein be "multi-mode capable."

In one embodiment, the first WAP device 202 includes an integrated system-on-a-chip (e.g., a Wi-Fi® SoC) 234, which includes the radios 204A, 204B, 204C, and 204D, transmit (TX) and receive (RX) channels, and a general purpose input/output (GPIO) multiplexer 238. In embodiments, at least some of the antenna switches 242 are also integrated within the Wi-Fi® SoC, and additional of the antenna switches 242 may be located off-chip of the Wi-Fi® SoC 234 to provide additional switching capability.

FIG. 3 is a graph 300 that illustrates channel allocation by radios under a wireless local area network (WLAN) protocol according to an embodiment. Across the top of the graph 300 are various UNII bands, which fall into Federal Communication Commission (FCC) regulated domains. The UNII-2 and UNII-2-Extended domains include DFS channels and overlapping channels for weather radar. Below the domain identifications are WiFi® channels, and below the WiFi® channels are illustrated potential communication link bandwidths that would subsume the above-identified WiFi® channels. For example, each discrete WiFi® channel spans over 20 MHz, and so any adjacent pair of channels spans 40 MHz, any series of four channels spans 80 MHz, and any series of eight channels spans 160 MHz.

Although a radio may operate on one primary channel (such as CH 100 for example), a radio can operate on a wider channel bandwidth such as over a 40, 80, or 160 MHz. Radar detection, however, may occur most frequently on the primary 20 MHz channel. For example, consider bandwidth 80 MHz with primary channel 52 and secondary channels 56, 60, and 64 (each 20 MHz wide). An interference event present on the secondary channels 56, 60, and 64 may not be reported unless the communication link bandwidth is reduced to 20 MHz for detection purposes. A communication link in this case may be defined to operate on a channel and bandwidth that has one or more 20 MHz channels as a "DFS radar channel."

Recognizing the fact that a DFS radar channel may be considered to include multiple secondary channels, two channel bandwidths may be defined for the communication link, namely an operating channel bandwidth and a communication link bandwidth. In various embodiments, the operating channel bandwidth is fixed at a maximum channel bandwidth allowed by the WLAN protocol for receiving data within the first primary channel and multiple secondary channels between two devices (e.g., two WAP devices or between a client wireless device and a WAP device). According to complementary embodiments, the communication link bandwidth is set to a first frequency range and is adjustable by the radio to be identical to or lower than the operating channel bandwidth.

In one embodiment, the operating channel bandwidth of the communication link is channel 80 MHz with primary channel 52, whereas the communication link bandwidth could be 20 MHz. In this case, the radios in the communication link perform 20 MHz frame exchange; however, the radios can still receive on the entire 80 MHz frequency band. The communication link bandwidth, however, could be expanded to include additional 20 MHz bands within the 80 MHz frequency band. Additional examples will be discussed with reference to FIGS. 5A-5E and FIGS. 6A-9B.

Figure 4:
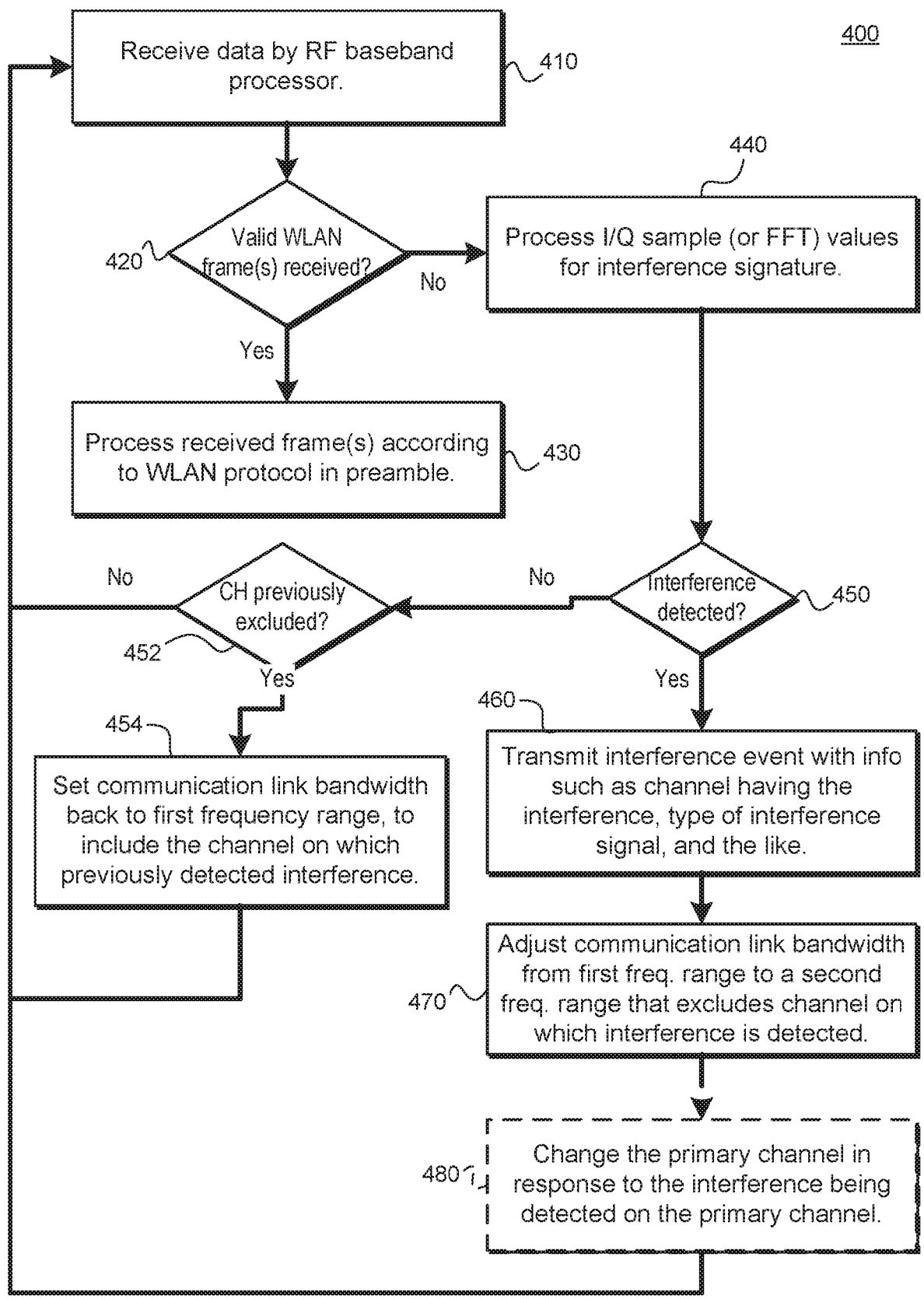
FIG. 4 is a flow chart for a method of detecting, and reporting in regards to, an interference signal signature on raw in-phase and quadrature (I/Q) sample values received by a radio according to an embodiment.

FIG. 4 is a flow chart for a method 400 of detecting, and reporting in regards to, an interference signal signature on raw in-phase and quadrature (I/Q) sample values received by a radio according to an embodiment. The method 400 may be performed by processing logic that may comprise hardware (e.g., circuitry, dedicated logic, programmable logic, microcode, etc.), software (such as instructions running on the processor), firmware or a combination thereof. In one embodiment, the method 400 is performed by the first radio 204A, to include the baseband processor 294, for example. In one embodiment, the radio generates the I/Q sample values via sampling (e.g., via demodulation) of incoming data received by the RFFE circuitry 280 (FIG. 2B).

With reference to FIG. 4, the method 400 may begin with the processing logic receiving data over a communication link with which is associated an operating channel bandwidth and a communication link bandwidth (410). The method 400 may continue with the processing logic determining whether the received data includes a valid WLAN frame (420). A valid WLAN frame may be, for example, a frame that identifies, within a preamble or header of a data packet, that the received data is 802.11 protocol data. If the answer is yes, the method 400 may continue with the processing logic processing the received frames according to the WLAN protocol identified in the preamble, and which also identify a MAC address of the wireless device with which it is linked (430). If the answer is no, the method 400 may continue with the processing logic processing raw I/Q sample values (e.g., FFT sample values) for an interference signal signature (440).

In various embodiments, the raw I/Q sample values are of 64 bits, 128 bits, 256 bits, or 512 bits a corresponding to 20 MHz, 40 MHz, 80 MHz, or 160 MHz operating channel bandwidth, respectively. In one embodiment, the processing is performed as frequency domain analysis on the raw I/Q sample values to identify which of the primary or secondary 20 MHz channels of the operating channel bandwidth may have an interference signal signature. When detecting a radar signature, this frequency domain analysis may use a combination of detected pulse width, amplitude, and a frequency spread of pulses within a radar pulsed pattern. The radar pulse frequency and the RSSI of the radar signals may also be determined. Note that this type of information may also be determined for other, non-radar interference signal signatures.

With further reference to FIG. 4, the method 400 may continue with the processing logic determining whether an interference signal signature (such as a radar signature) is detected within the raw I/Q sample values (450). If no, an interference signal signature is not detected in received data within a particular period of time, the method 400 may continue with the processing logic determining whether a channel within the operating channel bandwidth was previously excluded (452). If no channel was previously excluded, the method 400 may continue with the processing logic looping back to continue receiving data from the wireless device (410). If there was a channel previously excluded (see blocks 470 and 480 below), the method 400 may continue with the processing logic setting the communication link bandwidth back to the original (e.g., first) frequency range, e.g., expanding the communication link bandwidth back to again include the channel on which an interference signal signature was previously detected (454).

With further reference to FIG. 4, if yes, an interference signal signature was detected within the raw I/Q sample values, the method 400 may continue with the processing logic transmitting an interference event (e.g., to the wireless device with which it is linked and/or to the cluster server 250) with information such as the type of interference signal, the channel experiencing the interference, RSSI data of the interference signal, and other such information (460). The method 400 may continue with, in response to detecting the interference signature, the processing logic adjusting the communication link bandwidth from a first frequency range to a second frequency range that excludes the channel on which interference signals are detected (470). In embodiments, this adjustment is to reduce the communication link bandwidth to avoid the 20 MHz channel on which a radar or other interference signal signature has been detected. For example, assume that a channel 52 is the primary channel with a channel link bandwidth 80 Mhz. Upon detecting the interference signal signature on channel 64, the new communication link bandwidth may be adjusted to 40 Mhz. However, if communication link bandwidth was already at 40 Mhz, the radar interference on channel 64 may not cause any communication link bandwidth adjustment. This causes data to continue to flow on the reduced bandwidth without any overhead.

In one embodiment, the 802.11ac Very High Throughput (VHT) operating mode element is used to dynamically change the bandwidth. After some definite period of time, a communication link can resume a wider communication link bandwidth if desired and no radar is detected in the channels of the selected wider bandwidth. Radios on the link exchange (e.g., one TX radio and one RX radio) VHT operating mode elements may alert each other of detected interferences and the changes in communication link bandwidth.

In embodiments, the VHT operating mode element only reduces the communication link bandwidth, not the operating channel bandwidth, which remains constant and thus may avoid having to change to another DFS channel as long as interference is also not detected on the primary channel. The radios may send messages to other WAP devices and the cluster server 250 to propagate information (e.g., interference channel and type, new width of the communication link bandwidth, and if applicable, new primary channel) throughout the cluster of nodes within the WMN 100. Furthermore, despite having reduced the communication link bandwidth, a radio may still receive data on the entire spectrum of the operating channel bandwidth, and so can detect when the radar/interference has ceased and immediately expand the bandwidth back, e.g., to the first frequency range from the second frequency range.

With additional reference to FIG. 4, the method 400 may optionally continue with the processing logic changing the primary channel (e.g., to one of the secondary channels within the communication link bandwidth, if available) in response to the interference signal signature being detected on the primary channel (480). In one embodiment, the change in the primary channel includes ceasing data transmission using a first primary channel and instead using a secondary channel, which is free of interference signals, for data transmission. Following with the previous example, when radar is detected on primary channel 52, the WAP device may choose to reduce the communication link bandwidth and modify the primary channel to one of CH 56, CH 60, or CH 64. In embodiments, 802.11 Channel Switch Announcement (CSA) and Extended CSA (ECSA) frames are used to modify the primary channel for the linked radios. In embodiments, only the communication link bandwidth is modified and the operating link bandwidth remains same. The data traffic is exchanged on the new primary channel post primary channel change. Again, after some definite period of time, communication links can resume wider bandwidth communication if desired and no radar falls in the selected wider bandwidth.

In some embodiments, to avoid a scenario where both radios involved in a communication link detects radar/interference contemporaneously, the radio with higher MAC address sends the radar channel and signal strength information (e.g., RSSI) to the peer (or linked) radio with the smaller MAC address. The radio with the smaller MAC address may then perform the actual bandwidth management by taking into account 20 MHz sub-bands where radar is found by the radio and its peer radio. In this way, the radio with the smaller MAC address decides what should be the communication bandwidth.

In one embodiment, the WAP device has a first MAC address, the second WAP device has a second MAC address, and the radio 204A is further to, in response to the WAP device and the second WAP device detecting interference signals contemporaneously: receive, from the second WAP device due to the first MAC address being lower than the second MAC address, a message having information that the second WAP device has detected interference signals on the first primary channel and first values of received signal strength information (RSSI) associated with the first primary channel on the second WAP device. The radio 204A may then further determine, using the information received in the message in addition to the interference signal signature detected on the first primary channel and native RSSI associated with the first primary channel on the WAP device, a third frequency range of the communication link bandwidth that is less than the second frequency range and that excludes the first primary channel. The radio 204A may further determine that a second secondary channel of the plurality of secondary channels within the operating channel bandwidth does not comprise an interference signal signature, and communicate, back to the second WAP device, the third frequency range of the communication link bandwidth and a command to designate the second secondary channel as the primary channel. In one embodiment, the command to designate the secondary channel as the new primary channel includes information to cease data transmission using the primary channel and instead using the second secondary channel for data transmission.

FIGS. 5A through 5E illustrate a more detailed example where both the operating channel bandwidth and the communication channel bandwidth are initially set to 160 Mhz and the primary channel is initially set to CH 100. The bandwidth ranges illustrated in each of these Figures may be viewed as illustrated in graph 300 of FIG. 3. As discussed, the operating channel bandwidth remains 160 Mhz throughout operation of the communication link.

Figure 5A:
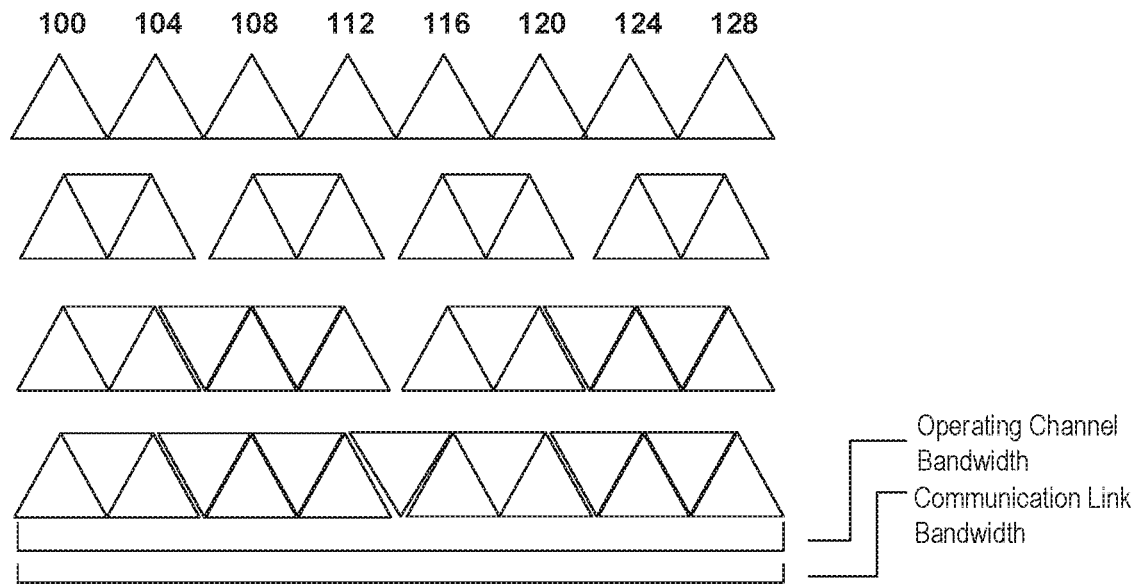
FIG. 5A is a set of graphs that illustrate an operating channel bandwidth and a communication link bandwidth of a communication link, in which the operating channel bandwidth includes a primary channel and multiple secondary channels, according to an embodiment.

FIG. 5A is a set of graphs that illustrate an operating channel bandwidth and a communication link bandwidth of a communication link, in which the operating channel bandwidth includes the primary channel (CH 100) and multiple secondary channels (CHs 104, 108, 112, 116, 120, 124, and 128), according to an embodiment.

Figure 5B:
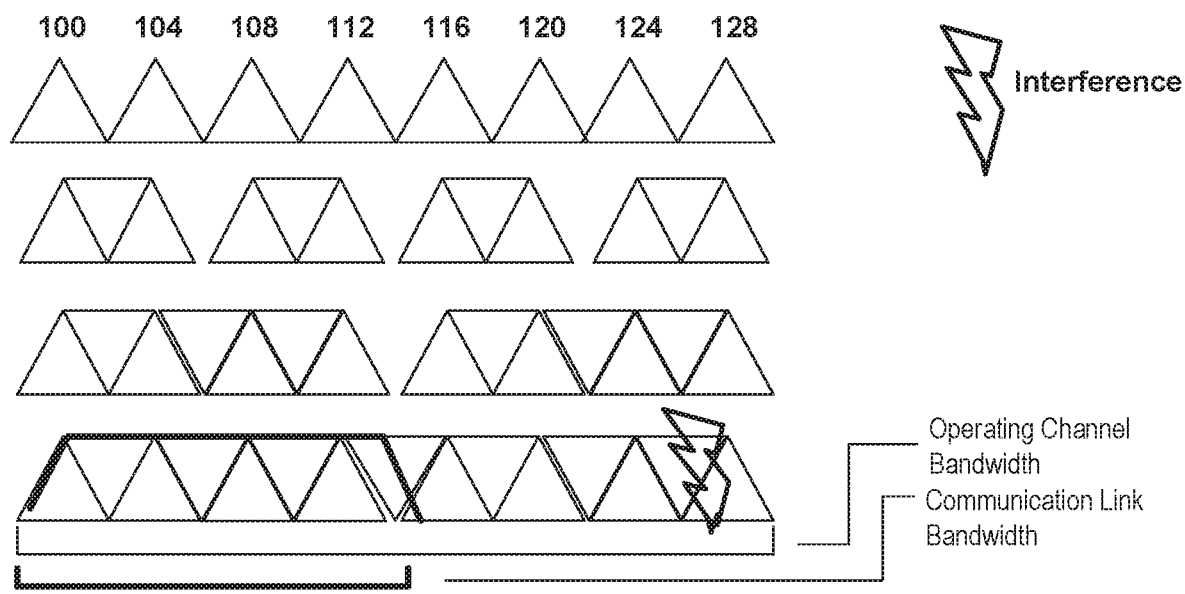
FIG. 5B is the set of graphs of FIG. 5A illustrating reduction of the communication link bandwidth to exclude a first secondary channel on which an interference is detected according to an embodiment.

FIG. 5B is the set of graphs of FIG. 5A illustrating reduction of the communication link bandwidth to exclude a first secondary channel (CH 128) on which an interference is detected according to an embodiment. The reduction of the communication link bandwidth is to 80 MHz, e.g., from 5490 MHz to 5570 MHz (see FIG. 3). In this case, data traffic keeps flowing and the radio detecting interference may send a VHT operating mode element to the linked radio to notify of the reduced communication channel bandwidth. The reduction in the communication link bandwidth has retained the primary channel (CH 100), and therefore no change of the primary channel in necessary. Accordingly, if the interference that is detected are radar signals, no CAC or channel change is required.

Figure 5C:
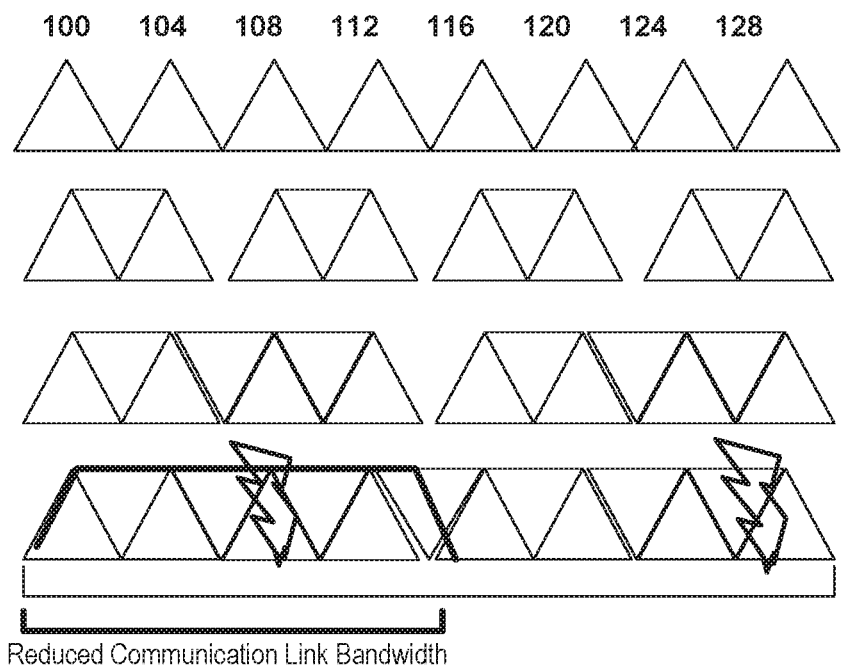
FIG. 5C is the set of graphs of FIG. 5B illustrating detection of an interference on a second secondary channel within the reduced communication link bandwidth according to an embodiment.
Figure 5D:
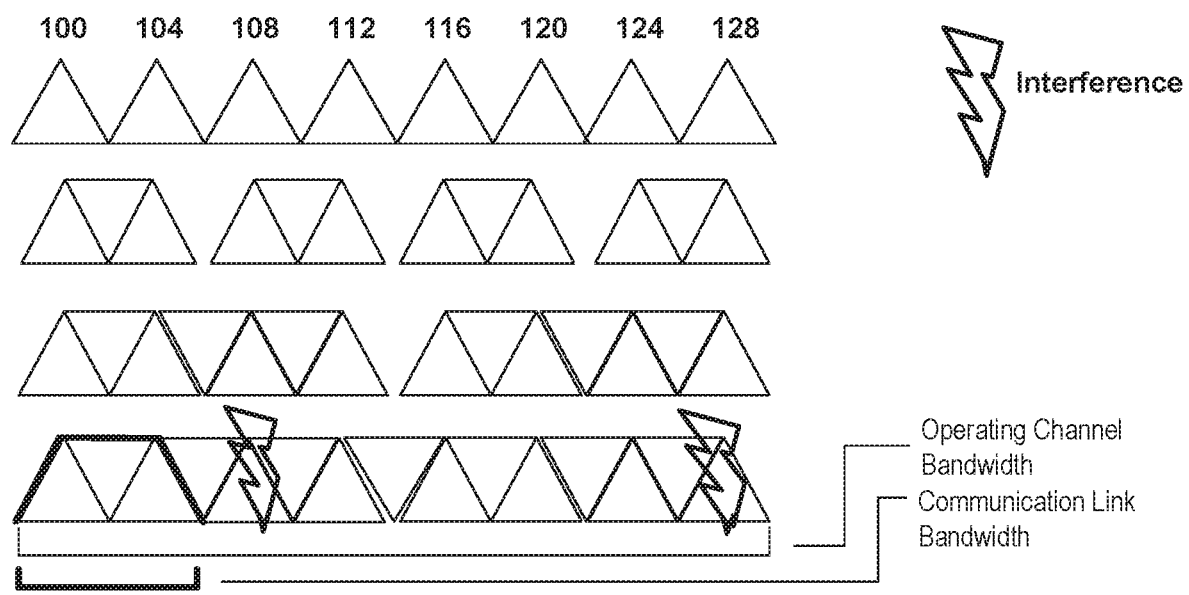
FIG. 5D is the set of graphs of FIG. 5C illustrating a further reduction of the communication link bandwidth to exclude the second secondary channel according to an embodiment.

FIG. 5C is the set of graphs of FIG. 5B illustrating detection of an interference on a second secondary channel (CH 108) within the reduced communication link bandwidth according to an embodiment. FIG. 5D is the set of graphs of FIG. 5C illustrating a further reduction of the communication link bandwidth to exclude the second secondary channel (CH 108) according to an embodiment. In this case, the communication link bandwidth may be further reduced to 40 Mhz, e.g., to 5490 MHz to 5530 Mhz. The further reduced communication link bandwidth still includes the primary channel (CH 100), and so again, there is no need to change the primary channel.

Figure 5E:
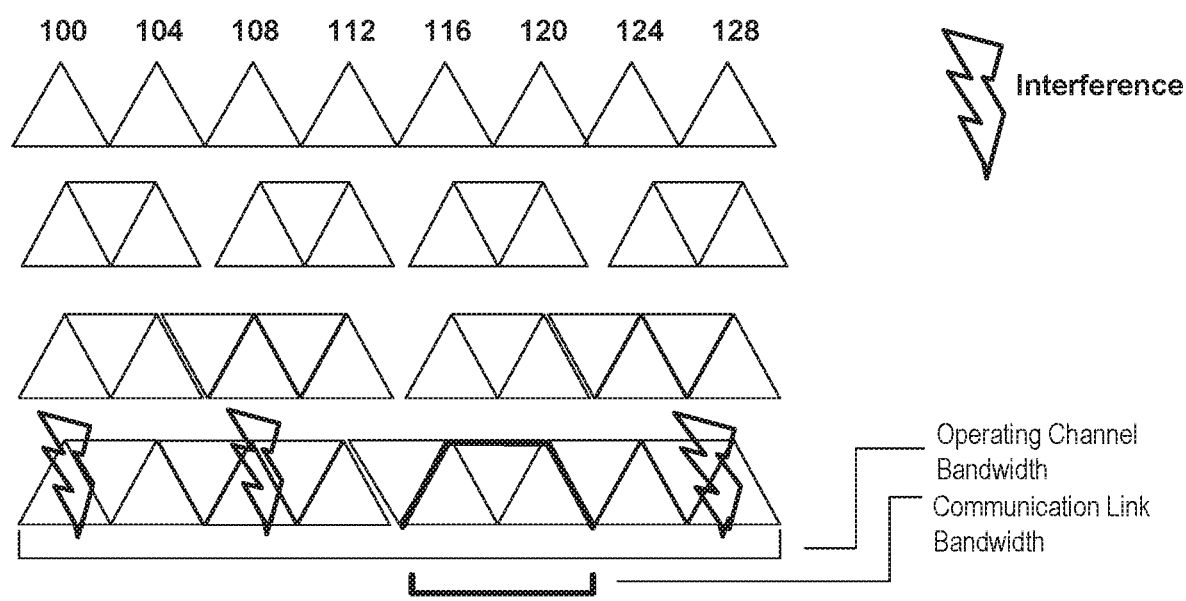
FIG. 5E is the set of graphs of FIG. 5D illustrating a move of the primary channel to one of the secondary channels in response to detecting an interference on the primary channel according to an embodiment.

FIG. 5E is the set of graphs of FIG. 5D illustrating a change of the primary channel (CH 100) to one of the secondary channels (CH 116) in response to detecting an interference on the primary channel according to an embodiment. The change in the primary channel may be communicated to the linked radio using CSA or ECSA frames or some other proprietary vendor command in a message. In this way, CH 116 has become the new (or second) primary channel. FIG. 5E also illustrates the channel link bandwidth being shifted to a 40 MHz bandwidth, starting at CH 116, to thus also exclude CH 100 from the communication link bandwidth. This provides a way to avoid the interferences on the several secondary channels and still operate on the second primary channel within the operating channel bandwidth.

Because the operating channel bandwidth remains the same 160 MHz and widest possible under the WLAN protocol, the radios monitor continuously for interference irrespective of current communication link bandwidth. Therefore, when a WAP device does not see interference (such as radar pulse) for a particular period of time, the radio may expand the communication link bandwidth back to include the cleared 20 Mhz channels. For example, with reference to FIG. 5E, assume the radio detects that the interference on CH 100 and CH 108 has vacated. The radio of the WAP device may immediately expand the communication link bandwidth to 80 Mhz (as per FIG. 4B) or even higher up to and excluding CH 128. Simultaneously, or concurrently, the radio may change the primary channel from CH 116 back to the home channel of CH 100. This avoids the need of the additional wait due to CAC requirements on a new DFS channel. Also, note that being done as part of a single communication link can optimize the channel bandwidth at a much faster rate, subject to regulatory mandatory wait period, compared with a current approach where moving back to the home channel requires at least a minute of CAC delay when radar is gone.

With additional reference to FIG. 2A, the cluster server 250 may also help in analyzing the I/Q sample values detected by WAP devices, e.g., where there is no valid WLAN frame detected within a data packet. For example, the processor 252 may receive the I/Q sample values, and perform a classification of the type of interference signal signature detected, and create a real-time heat map from data received from the multiple WAP device. Such a heat map may indicate areas and channels experiencing interference detection, and may help direct the multiple WAP devices within the cluster which channels to be on and to include in the current communication link bandwidths. In some case, this may be performed via updating the bandwidth selection priority list 209A and the primary channel priority list 209B.

Alternatively, or additionally, each WAP device may utilize historic data such as channel congestion, previous interference events, and application level throughput and latency requirements received from the cloud to decide the bandwidth selection and/or primary channel migration priorities.

As discussed, previously, however, the cluster server 250 may store the historic interference event data 266, radar carrier channel information across WAP devices of the cluster, locations of the WAP devices (e.g., from the cluster topology information 262), per-channel antenna configurations 270, the channel congestion data 264, and the application-based throughput and latency requirements 268. The cluster server 250 may use all of this data and information to generate the bandwidth selection priority list 209A and the primary channel priority list 209B. The cluster server 250 may then propagate the bandwidth selection priority list 209A and primary channel migration priority list 209B to each of the WAP devices in the cluster. Each WAP device may use these priority lists to dynamically adjust its operation bandwidth and/or to change its primary channel base. FIG. 6A through FIG. 9D will illustrate how some of this data and information may be deployed in any given WAP device and as may pertain to adjacent WAP devices.

Figure 6A:
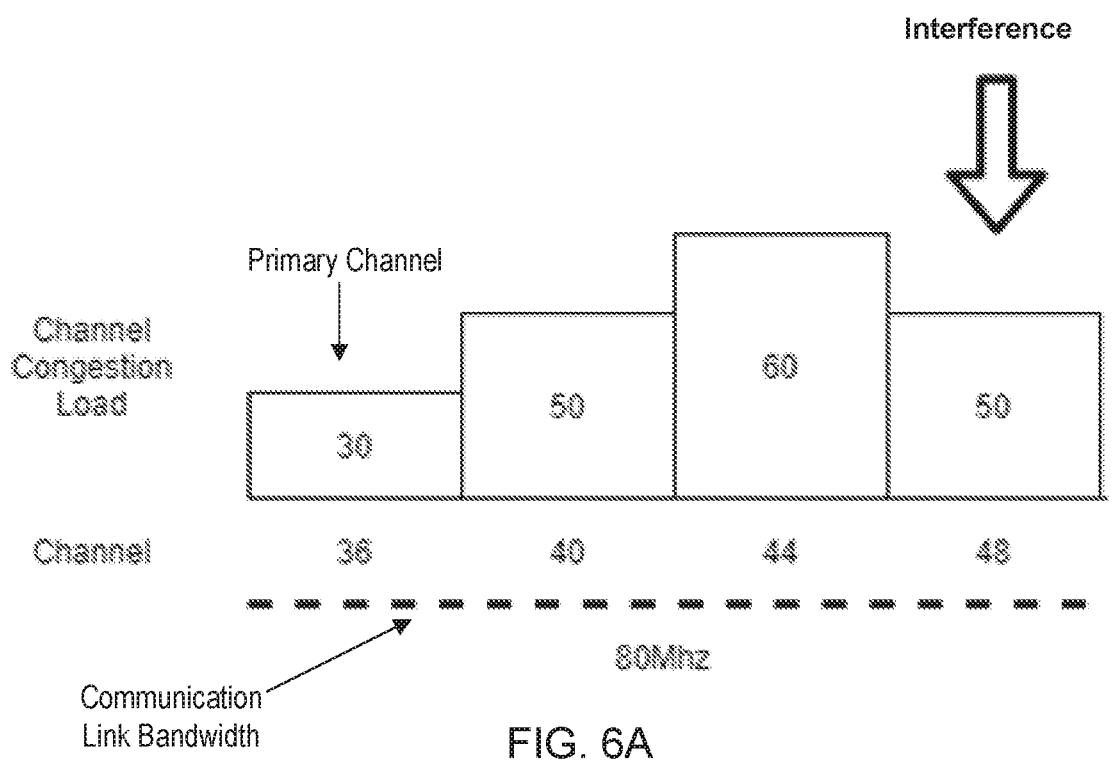
FIG. 6A is a graph that illustrates channel congestion load and detection of an interference on a first secondary channel of a communication link bandwidth according to an embodiment.
Figure 6B:
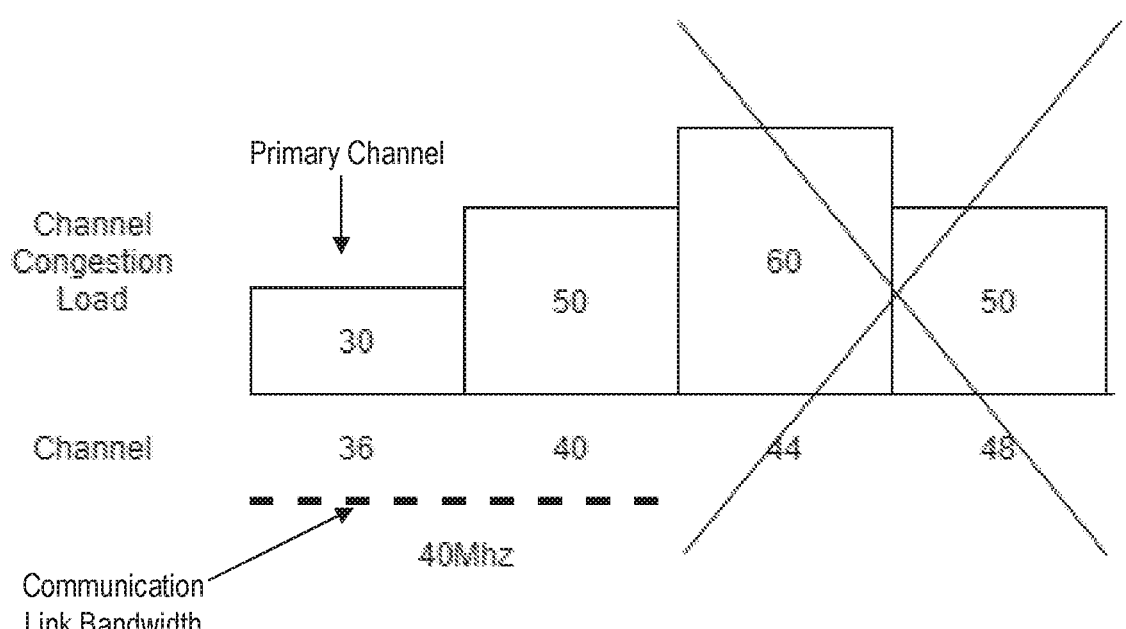
FIG. 6B is the graph of FIG. 6A illustrating a decision to reduce the communication link bandwidth from a first frequency range to a second frequency range based on the detection of the interference on the first secondary channel according to an embodiment.

FIG. 6A is a graph that illustrates channel congestion load and detection of an interference on a first secondary channel (CH 48) of a communication link bandwidth according to an embodiment. Assume that the primary channel is CH 36. FIG. 6B is the graph of FIG. 6A illustrating a decision to reduce the communication link bandwidth from a first frequency range to a second frequency range based on the detection of the interference on the first secondary channel according to an embodiment. To avoid the relatively high channel congestion on CH 44, the cluster server 250 may direct the WAP device to reduce the communication link bandwidth from 80 MHz (first frequency range) to 40 MHz (second frequency range). This reduction in bandwidth has excluded CH 44 and CH 48, and retained CH 36 and CH 40, so the primary channel has not had to change. In this way, the reduction in communication link bandwidth has changed away from channels with high levels of traffic congestion.

Figure 7A:
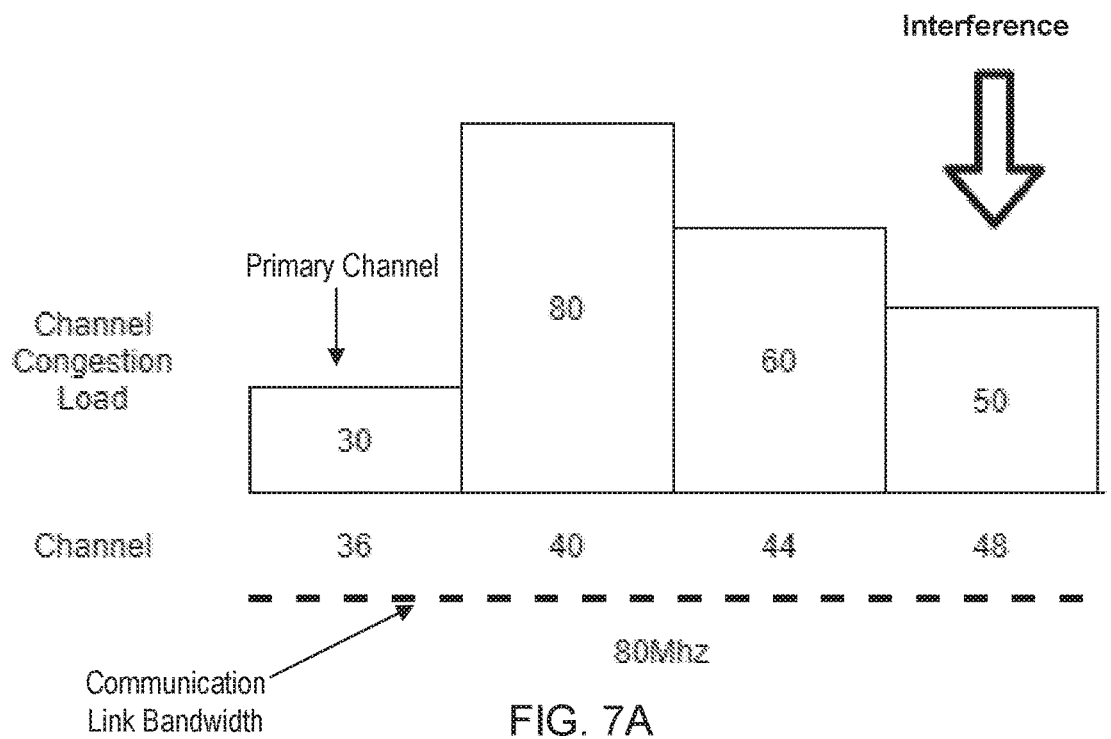
FIG. 7A is a graph that illustrates channel congestion load and detection of an interference on a first secondary channel of the communication link bandwidth according to another embodiment.
Figure 7B:
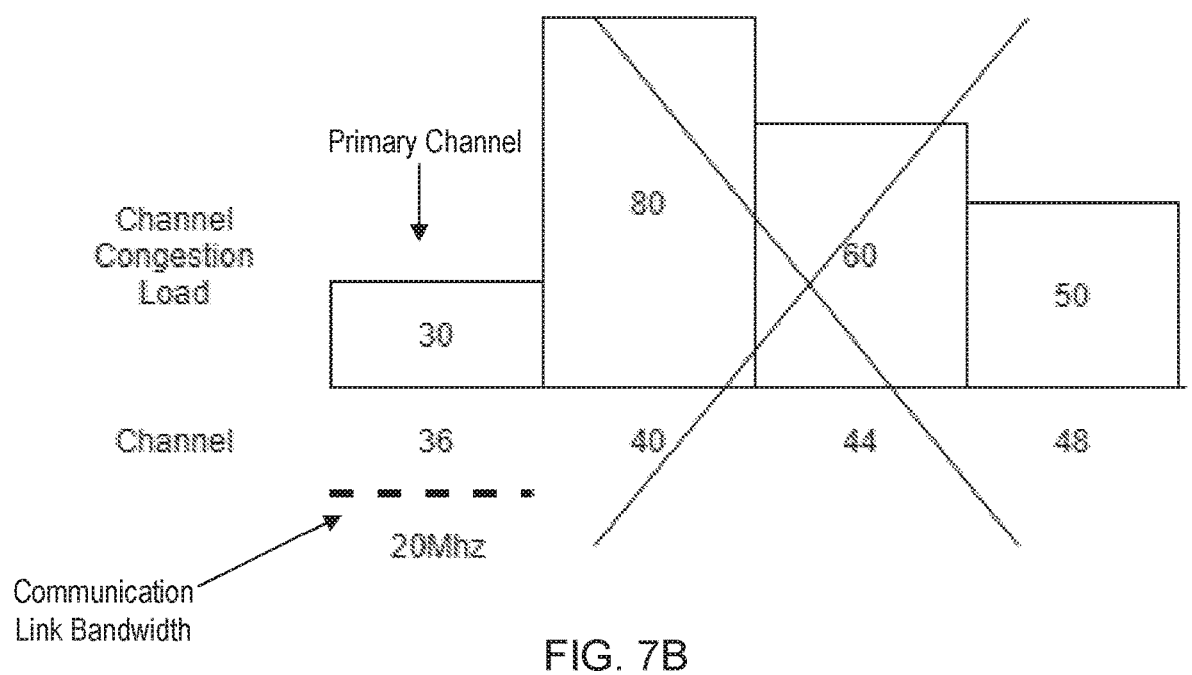
FIG. 7B is the graph of FIG. 7A illustrating a decision to reduce the communication link bandwidth from a first frequency range to a second frequency range based on the detection of the interference on the first secondary channel according to another embodiment.

FIG. 7A is a graph that illustrates channel congestion load and detection of an interference on a first secondary channel (CH 48) of the communication link bandwidth according to another embodiment. Assume that the primary channel is CH 36. FIG. 7B is the graph of FIG. 7A illustrating a decision to reduce the communication link bandwidth from a first frequency range (80 MHz) to a second frequency range (20 Mhz) based on the detection of the interference on the first secondary channel (CH 48) according to another embodiment. In this case, the 20 Mhz communication link bandwidth includes only the primary channel, CH 36. The cluster server 250 may direct the WAP device in this reduction of the communication link bandwidth based on the high level of traffic congestion on CH 40 and CH 44. Once again, however, there has been no need to change the primary channel, which experiences relatively low congestion.

Figure 8A:
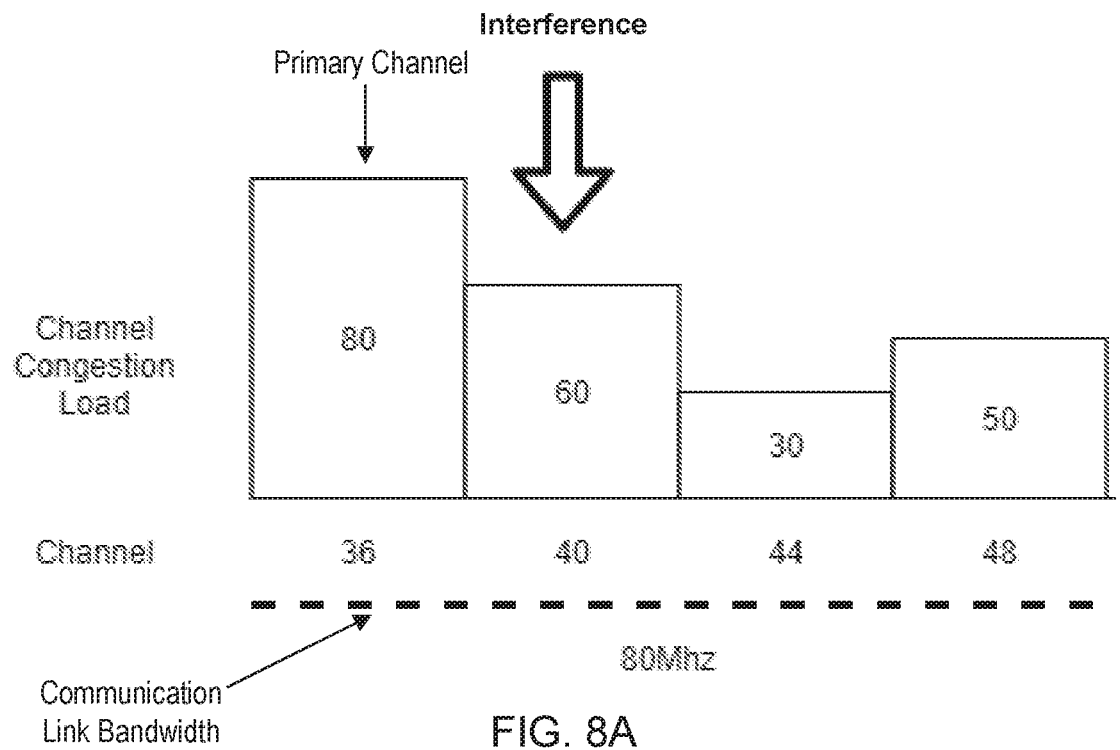
FIG. 8A is a graph that illustrates channel congestion load and detection of an interference on a third secondary channel of the communication link bandwidth according to an embodiment.
Figure 8B:
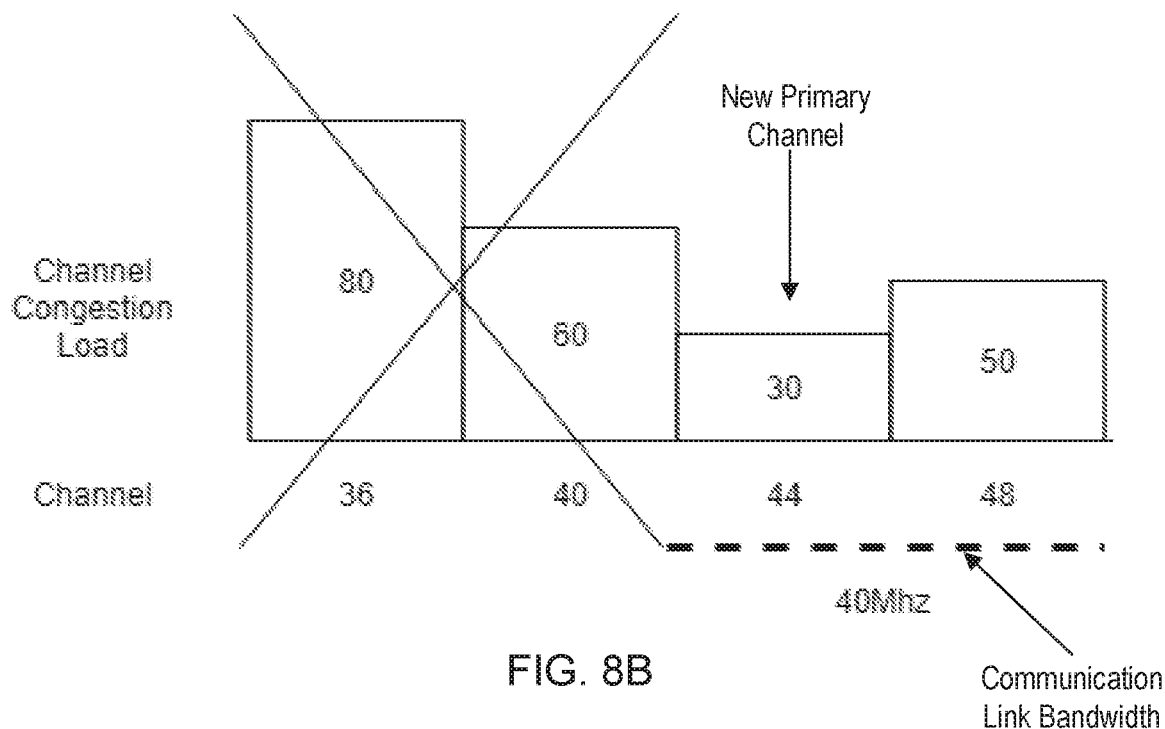
FIG. 8B is the graph of FIG. 7A illustrating a decision to reduce the communication link bandwidth from a first frequency range to a second frequency range, and to change the primary channel, based on the detection of the interference on the third secondary channel according to an embodiment.

FIG. 8A is a graph that illustrates channel congestion load and detection of an interference on a third secondary channel (CH 40) of the communication link bandwidth according to an embodiment. Assume that the primary channel is initially set to CH 36 as before. FIG. 8B is the graph of FIG. 7A illustrating a decision to reduce the communication link bandwidth from a first frequency range (80 MHz) to a second frequency range (40 MHz), and to change the primary channel, based on the detection of the interference on the third secondary channel according to an embodiment. In this case, the cluster server 250 may determine that the high traffic congestion is on CH 36 and CH 40, and thus direct the WAP device(s) to reduce the communication link bandwidth to include CH 44 and CH 48. In this case, because this change in communication link bandwidth excludes the primary channel, the cluster server 250 also directs the WAP device(s) to change the primary channel from CH 36 to CH 44, a new (or second) primary channel.

In various embodiments, the WAP devices may also coordinate with other WAP devices in a cluster on communication link bandwidth reduction and on changes of the primary channel. For example, two WAP devices may decide whether to change the primary channel and how to reduce the communication channel bandwidth when detecting interference on a given channel. In some cases, the decision may on communication channel bandwidth may diverge, but in a way that the two WAP devices may still share the primary channel if they are to be linked. FIGS. 9A-9D illustrate this coordination by way of example.

FIG. 9A is a graph illustrating channel congestion load and detection of an interference on a first secondary channel (CH 40) of a first WAP device according to an embodiment. FIG. 9B is a graph illustrating channel congestion load and detection of an interference on the first secondary channel (CH 40) of a second WAP device according to an embodiment. Accordingly, the interference is detected on the same channel on both the first and second WAP devices.

Figure 9C:
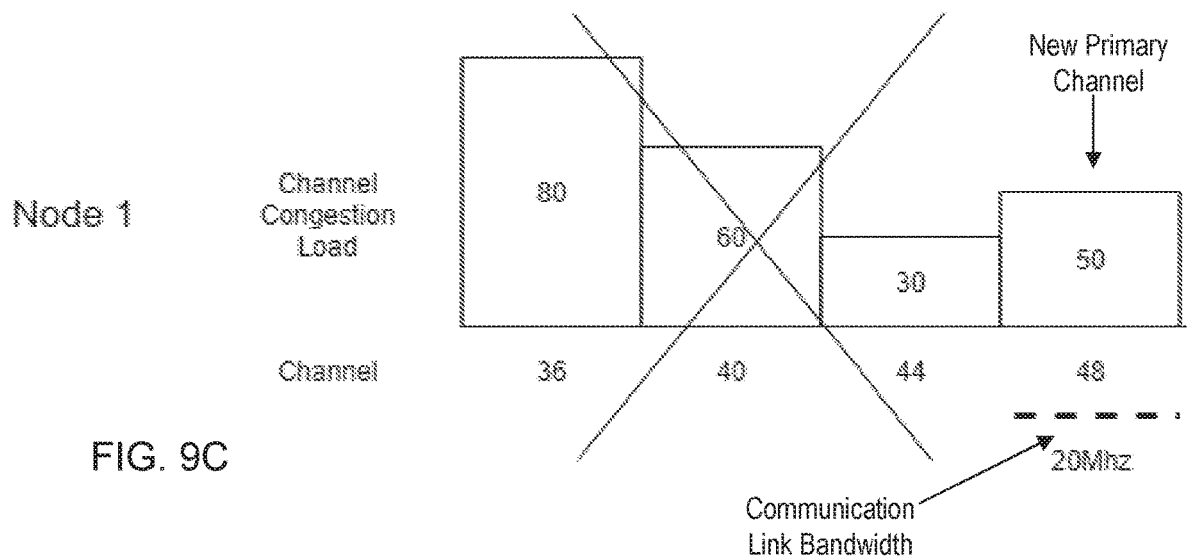
FIG. 9C is the graph of FIG. 9A illustrating a decision to reduce the communication link bandwidth and change the primary channel based on the detection of the interference on the first secondary channel of the first WAP device according to an embodiment.

FIG. 9C is the graph of FIG. 9A illustrating a decision to reduce the communication link bandwidth and change the primary channel based on the detection of the interference on the first secondary channel (CH 40) of the first WAP device according to an embodiment. In this case, the first WAP device decides to reduce the communication link bandwidth to 20 MHz from 80 Mhz, and to change the primary channel to CH 48. Because the first WAP device is linked to the second WAP device within the cluster, the first WAP device would communicate the channel on which the interference is detected (or at least the frequency of the interference), the reduced communication bandwidth (20 Mhz), and the new primary channel (CH 48) to the second WAP device.

Figure 9D:
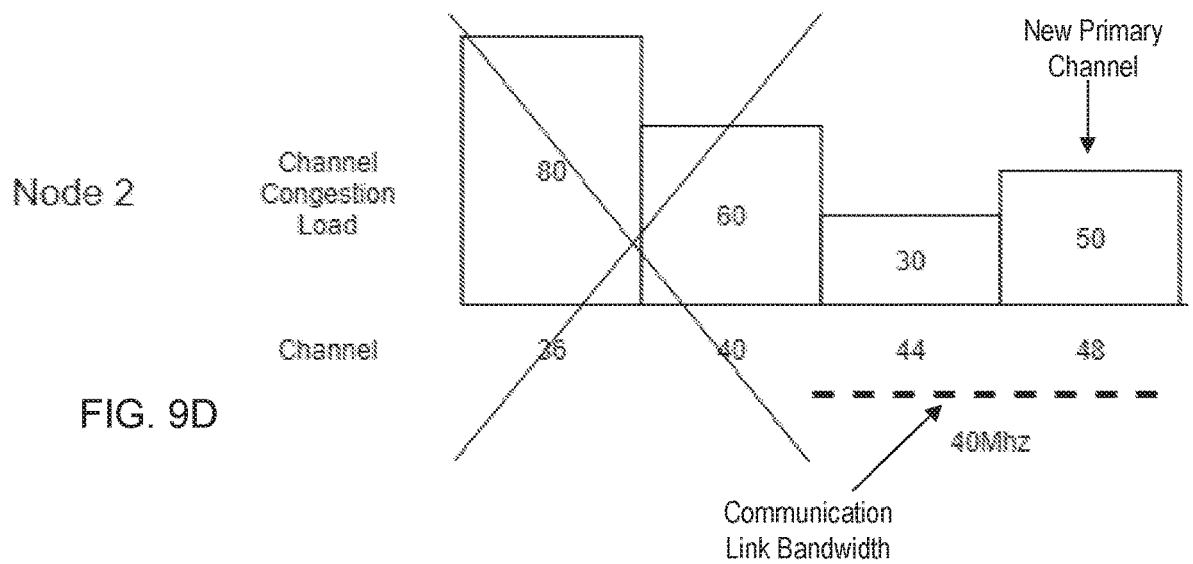
FIG. 9D is the graph of FIG. 9B illustrating a decision to reduce the communication link bandwidth and change the primary channel based on detection of the interference on the first secondary channel of the second WAP device and consistent with the primary channel change by the first WAP device according to an embodiment.

FIG. 9D is the graph of FIG. 9B illustrating a decision to reduce the communication link bandwidth and change the primary channel based on detection of the interference on the first secondary channel (CH 40) of the second WAP device and consistent with the primary channel change by the first WAP device according to an embodiment. In other words, while the second WAP device retains a wider 40 MHz communication link bandwidth, the second WAP device retains the new primary channel (CH 48) to which it also changes. In this scenario, the second WAP device retains the wider communication link bandwidth to serve latency-sensitive applications that require more bandwidth.

According to one embodiment, the first WAP device receives channel congestion data from an adjacent second WAP device, the channel congestion data associated with traffic congestion on the secondary channels of the adjacent second WAP device. The first WAP device may further receive, from the adjacent second WAP device, confirmation of detection of the interference signal signature on the first secondary channel. The first WAP device may further coordinate, with the adjacent second WAP device using the channel congestion data and the confirmation, the adjusting the communication link bandwidth in order to also share the first primary channel with the adjacent second WAP device.

According to another embodiment, the first WAP device receives application-based throughput and latency requirements from an adjacent second WAP device, the application-based throughput and latency requirements associated with an application on secondary channels of the adjacent second WAP device. The first WAP device may further receive, from the adjacent second WAP device, confirmation of detection of the interference signal signature on the first primary channel. The first WAP device may further coordinate, with the adjacent second WAP device using the application-based throughput and latency data and the confirmation, the moving the first primary channel according to the primary channel priority list in order to still share the second primary channel with the adjacent second WAP device.

Figure 10:
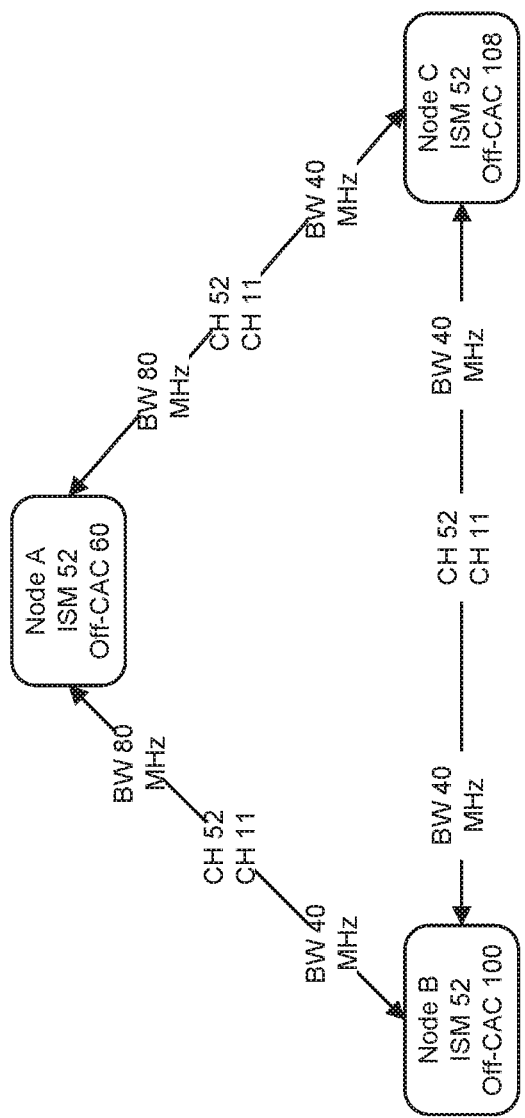
FIG. 10 is a network diagram that illustrates three neighbor WAP devices within a WMN according to an embodiment.

FIG. 10 is a network diagram that illustrates three neighbor WAP devices within the WMN 100 according to an embodiment. The three neighbor WAP devices are labeled as Node A, Node B, and Node C. Each node may have two or more command paths with another node such that, in the event of a node has to change a primary channel due to detecting a radar (or other interference) event, the node may communicate the change reason (e.g., presence of radar, microwaves, or the like) and the new primary channel to its neighbor nodes (e.g., the nodes wirelessly connected). Likewise, each node may communicate its current communication link bandwidth (BW) with its neighbor nodes. In this way, the each node knows on what channel(s) can still communicate on with its neighbor nodes.

Because the multiple WAP devices in the system 200 are multi-mode capable, each master node may detect the presence of radar interference for one or more channels, thus allowing a master node to open up more than one DFS channel to the WMN 100. Further, the master node may perform in-service monitoring (ISM) on its primary channel while scheduling off-channel channel availability check (CAC) on a different channel. For example, with reference to FIG. 10, Node A may perform off-channel CAC on channel 60, Node B may perform off-channel CAC on channel 100, and Node C may perform off-channel CAC on channel 108. Using off-channel CAC, the multi-mode WAP devices may have multiple DFS channels available as backup channels in the case of a radar event. The off-channel CAC may be performed on a second radio and second coupled antenna, assuming the primary channel is operated over a first radio coupled to a first antenna.

Furthermore, upon detecting an interference event, an originator WAP device (e.g., originator node that detects the radar event) may pause data transmissions, broadcast the channel, channel change information in its beacon in the form of a Channel Switch Announcement to inform proximity neighbors, and generate an interference event packet (IEP). The IEP may include, for example, the channel of detected interference, the node's origin medium access control (MAC address), the new proposed channel, interference event time, and channel change time. The originator WAP device may propagate the IEP throughout the WMN 100. Each receiving WAP device is to respond with a response IEP packet with its own MAC address, whether it has detected interference on the same channel, and its physical distance from the originator WAP device. A WAP device that receives the IEP may also add its own radar detection metric and relay the IEP throughout the WMN 100. The originator WAP device is to decide within 10 seconds whether to proceed with the channel change or abort the channel change depending on the IEP response packets.

Each of the WAP devices (e.g., Node A, Node B, and Node C in FIG. 10) may further determine a physical distance from the interference source 130 (FIG. 4A). If Nodes A, B, and C are generally in straight line, and Node A detects radar at −65 dB, Node B may determine its relative physical distance to Node A. Node B may then determine the location of source of interference signal. In an additional embodiment, Node B may analyze RSSI data of interference from the interference source for levels of degradation, and deduce, from known locations of Node A and Node C, its physical distance from the interference source 130. By also determining (or being informed of) the location of the interference source 130, the cluster server 250 may determine which WAP device(s) to direct to which ranges of communication link bandwidth and/or primary channel in order to best avoid the interference from the interference source 130.

FIGS. 11A and 11B are a network diagram of multiple WAP devices (nodes) within the WMN 100 that illustrates interference event packet propagation between neighbor WAP devices according to an embodiment. For example, assume the multiple WAP devices include Node A that does ISM on primary channel 52, Node B that performs ISM on primary channel 52, Node C that perform ISM on primary channel 52, and Node D that also performs ISM on primary channel 52. When an interference event is detected on the primary channel, the originator node (e.g., Node) may include the next channel information in the IEP and each receiving node is to continue to propagate this next channel information to its neighbor nodes (e.g., those nodes with which the node is wirelessly connected). As illustrated in FIG. 11A, the IEP from Node A includes an indicator that an interference event has been detected on primary channel 52 and a next channel to which to switch is secondary channel 36. Node C may pass the IEP from the originator Node A on to Node D, and in this way, the IEP is replicator onto the WMN 100. Each of Node B, Node C, and Node D may respond, confirming (or not confirming) detection of the interference event. In one embodiment, each of the Node B, Node C, and Node D changes to the secondary channel 36 as the new (or second) primary channel in the absence of an abort command from Node A.

FIG. 12 is a flow chart of a method 1200 for radio interference detection and channel bandwidth management according to an embodiment. The method 1200 may be performed by processing logic that may comprise hardware (e.g., circuitry, dedicated logic, programmable logic, microcode, etc.), software (such as instructions running on the processor), firmware or a combination thereof. In one embodiment, the method 1200 is performed by the first radio 204A, to include the baseband processor 294, for example.

With reference to FIG. 12, the method 1200 may begin with the processing logic establishing a communication link on a first primary channel using a wireless local area network (WLAN) protocol (1205). In embodiments, the communication link has an operating channel bandwidth and a communication link bandwidth, where the operating channel bandwidth is fixed at a maximum channel bandwidth allowed by the WLAN protocol for receiving data within the first primary channel and a plurality of secondary channels. The communication link bandwidth may be set to a first frequency range and be adjustable by the radio to be identical to or lower than the operating channel bandwidth. The method 1200 may continue with the processing logic transmitting first data on the communication link with the communication link bandwidth set to the first frequency range (1210). The method 1200 may further include the processing logic receiving second data on the communication link (1212). The method 1200 may continue with the processing logic determining that the second data does not include a valid WLAN frame, wherein the second data includes in-phase and quadrature (I/Q) sample values (1215).

With additional reference to FIG. 12, the method 1200 may continue with the processing logic determining that a first secondary channel of the plurality of secondary channels comprises a radar signature via application of frequency domain analysis on the I/Q sample values (1220). The method 1200 may continue with the processing logic determining that a second secondary channel of the plurality of secondary channels within the operating channel bandwidth does not have a radar signature (1225). The method 1200 may continue with the processing logic adjusting the communication link bandwidth from the first frequency range to a second frequency range, where the second frequency range includes the second secondary channel and excludes the first secondary channel that has the radar signature (1230). The method 1200 may continue with the processing logic communicating second data on the communication link with the communication link bandwidth set to the second frequency range (1235).

Figure 13:
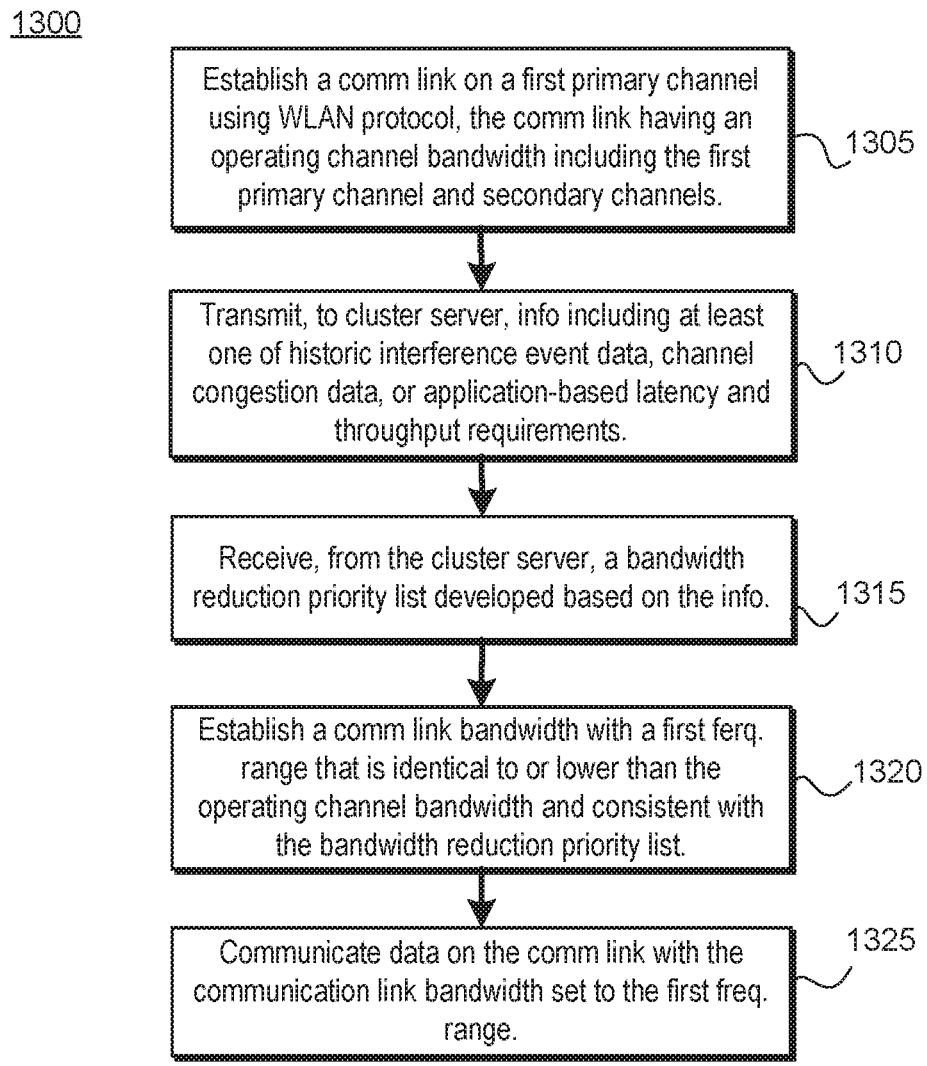
FIG. 13 is a flow chart of a method for radio interference detection and channel bandwidth management according to another embodiment.

FIG. 13 is a flow chart of a method 1300 for radio interference detection and channel bandwidth management according to another embodiment. The method 1300 may be performed by processing logic that may comprise hardware (e.g., circuitry, dedicated logic, programmable logic, microcode, etc.), software (such as instructions running on the processor), firmware or a combination thereof. In one embodiment, the method 1300 is performed by the first WAP device 202, e.g., by the first radio 204A, for example.

With reference to FIG. 13, the method 1300 begins with the processing logic establishing a communication link on a first primary channel using a wireless local area network (WLAN) protocol, the communication link having an operating channel bandwidth comprising the first primary channel and a plurality of secondary channels (1305). The method 1300 may continue with the processing logic transmitting, to the cluster server 250, information comprising at least one of historic interference event data, channel congestion data, or application-based latency and throughput requirements associated with the plurality of secondary channels (1310). The method 1300 may continue with the processing logic receiving, from the cluster server 250, a bandwidth selection priority list developed by the cluster server based on the information (1315). The method 1300 may continue with the processing logic establishing a communication link bandwidth with a first frequency range that is identical to or lower than the operating channel bandwidth and is consistent with the bandwidth selection priority list received from the cluster server (1320). The method 1300 may continue with the processing logic communicating data on the communication link with the communication link bandwidth set to the first frequency range (1325).

Figure 14:
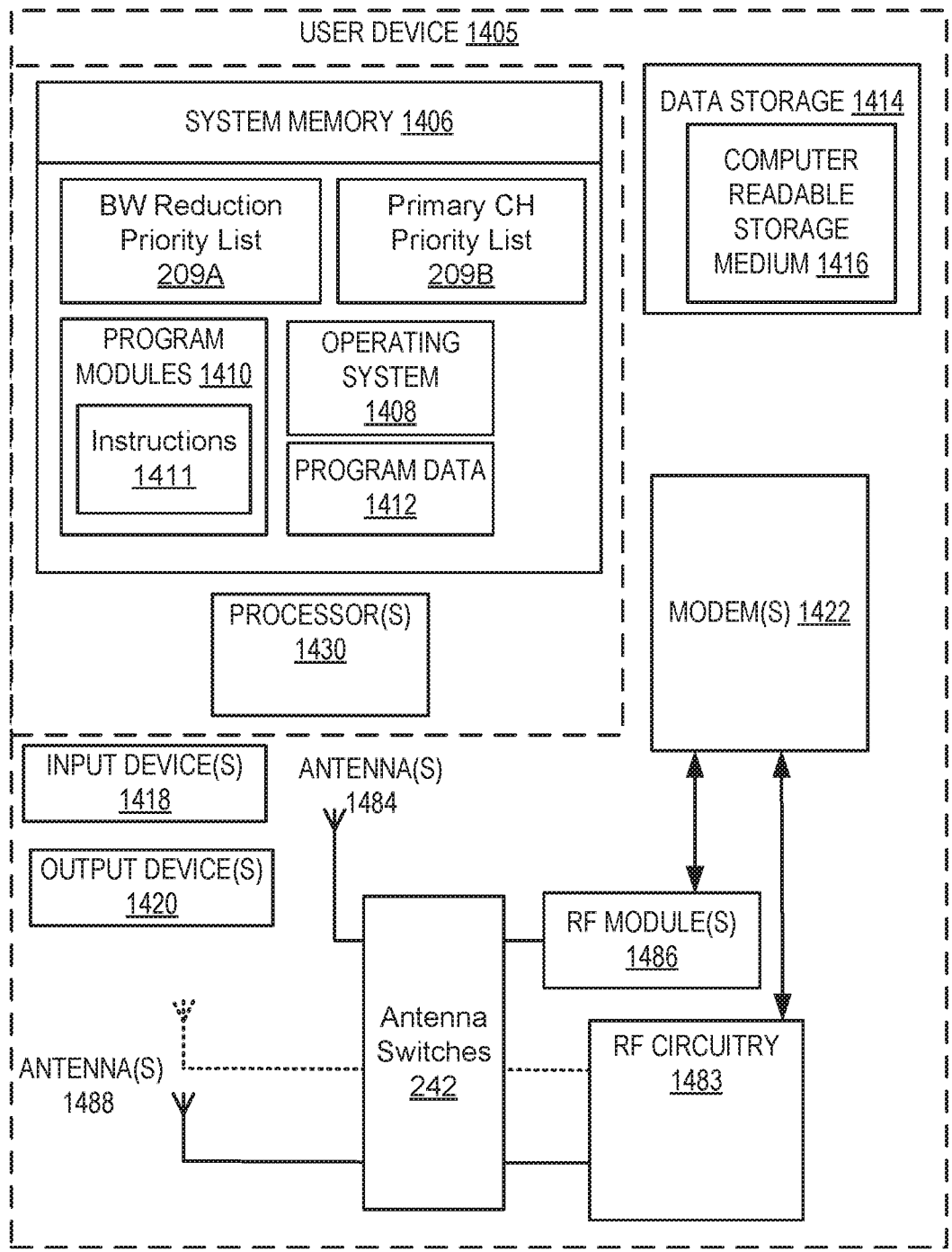
FIG. 14 is a block diagram of a user device in which embodiments of the system of FIGS. 2A, 2B, and 2C may be implemented according to various embodiments.

FIG. 14 is a block diagram of a user device 1405 in which embodiments of the system 200 for radio interference detection and dynamic channel bandwidth management may be implemented. The user device 1405 may correspond to the first WAP device 202 or one of the client wireless devices 212, 214, 216 (FIG. 2A). The user device 1405 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 1405 may be any portable or stationary user device. For example, the user device 1405 may be an intelligent voice control and speaker system. Alternatively, the user device 1405 can be any other device used in a WLAN network (e.g., Wi-Fi® network), a WAN network, or the like.

The user device 1405 includes one or more processor(s) 1430, such as one or more CPUs, microcontrollers, field programmable gate arrays, or other types of processors. The user device 1405 also includes system memory 1406, which may correspond to any combination of volatile and/or non-volatile storage mechanisms. The system memory 1406 stores information that provides operating system component 1408, various program modules 1410 (to include instructions 1411 or other code), program data 1412, and/or other components. In one embodiment, the system memory 1406 stores instructions of the methods 400, 1200, and 1300 as described herein. The user device 1405 performs functions by using the processor(s) 1430 to execute instructions provided by the system memory 1406, as may be loaded by one of the program modules 1410. The instructions may implement the BW/CH controller 122. The processor(s) 1430 may then retrieve entries from the bandwidth selection priority list 209A and/or the primary channel priority list 209B to determine which of multiple antenna(s) 1484 and 1488 to select, via selective control of the antenna switches 242, over which to transmit frames of a data stream and to receive acknowledgements.

The user device 1405 also includes a data storage device 1414 that may be composed of one or more types of removable storage and/or one or more types of non-removable storage. The data storage device 1414 includes a computer-readable storage medium 1416 on which is stored one or more sets of instructions embodying any of the methodologies or functions described herein. Instructions for the program modules 1410 may reside, completely or at least partially, within the computer-readable storage medium 1416, system memory 1406 and/or within the processor(s) 1430 during execution thereof by the user device 1405, the system memory 1406 and the processor(s) 1430 also constituting computer-readable media. The user device 1405 may also include one or more input devices 1418 (keyboard, mouse device, specialized selection keys, etc.) and one or more output devices 1420 (displays, printers, audio output mechanisms, etc.).

The user device 1405 further includes a modem 1422 to allow the user device 1405 to communicate via a wireless network (e.g., such as provided by the wireless communication system) with other computing devices, such as remote computers, an item providing system, and so forth. The modem 1422 can be connected to RF circuitry 1483 and zero or more RF modules 1486. The RF circuitry 1483 may be a WLAN module, a WAN module, PAN module, or the like. Antennas 14813 are coupled to the RF circuitry 1483, which is coupled to the modem 1422. Zero or more antennas 1484 can be coupled to one or more RF modules 1486, which are also connected to the modem 1422. The zero or more antennas 1484 may be GPS antennas, NFC antennas, other WAN antennas, WLAN or PAN antennas, or the like. The modem 1422 allows the user device 1405 to handle both voice and non-voice communications (such as communications for text messages, multimedia messages, media downloads, web browsing, etc.) with a wireless communication system. The modem 1422 may provide network connectivity using various types of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc., although not all of these mobile network technologies may be available.

The modem 1422 may generate signals and send these signals to one of the multiple antennas 1488, and 1484 via RF circuitry 1483, and RF module(s) 1486 as descried herein. User device 1405 may additionally include a WLAN module, a GPS receiver, a PAN transceiver and/or other RF modules. These RF modules may additionally or alternatively be connected to one or more of antennas 1484, 1488. Antennas 1484, 1488 may be configured to transmit in different frequency bands and/or using different wireless communication protocols. The antennas 1484, 1488 may be directional, omnidirectional, or non-directional antennas. In addition to sending data, antennas 1484, 1488 may also receive data, which is sent to appropriate RF modules connected to the antennas.

In one embodiment, the user device 1405 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna building that operates at a first frequency band and the second wireless connection is associated with a second resonant mode of the antenna building that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1422 is shown to control transmission and reception via antenna (1484, 1488), the user device 1405 may alternatively include multiple modems, each of which is configured to transmit/receive data via a different antenna and/or wireless transmission protocol.

The user device 1405 delivers and/or receives items, upgrades, and/or other information via the network. For example, the user device 1405 may download or receive items from an item providing system. The item providing system receives various requests, instructions and other data from the user device 1405 via the network. The item providing system may include one or more machines (e.g., one or more server computer systems, routers, gateways, etc.) that have processing and storage capabilities to provide the above functionality. Communication between the item providing system and the user device 1405 may be enabled via any communication infrastructure. One example of such an infrastructure includes a combination of a wide area network (WAN) and wireless infrastructure, which allows a user to use the user device 1405 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1405.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1405 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1405 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known buildings and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless access point (WAP) device comprising:
a radio to establish a communication link with a second WAP device on a first primary channel using a wireless local area network (WLAN) protocol, the communication link having an operating channel bandwidth and a communication link bandwidth, wherein the operating channel bandwidth comprises the first primary channel and a plurality of secondary channels, and the communication link bandwidth comprises a frequency range identical to or lower than a frequency range of the operating channel bandwidth, wherein the communication link bandwidth also includes at least the first primary channel; and
wherein the WAP device is to:
receive first data via the communication link;
determine that the first data does not include a valid WLAN frame, wherein the first data comprises in-phase and quadrature (I/Q) sample values;
determine, using the I/Q sample values, that a first secondary channel of the plurality of secondary channels comprises an interference signal signature; and
modify the communication link bandwidth from a first frequency range of the operating channel bandwidth to a second frequency range that is lower than the first frequency range, wherein the second frequency range includes the first primary channel and does not include the first secondary channel.

2. The WAP device of claim 1, wherein the WAP device is further to:
transmit, to the second WAP device, a message comprising information (i) that the communication link bandwidth has been set to the second frequency range and (ii) about a frequency of the interference signal signature on the first secondary channel; and
communicate with the second WAP device using only the second frequency range.

3. The WAP device of claim 1, wherein the WAP device is further to:
receive second data over a period of time;
generate second I/Q sample values via sampling the second data;
determine that the second I/Q sample values received via the first secondary channel are free of interference signals; and
set the communication link bandwidth back to the first frequency range.

4. The WAP device of claim 1, wherein the WAP device is further to:
receive second data via the operating channel bandwidth of the communication link;
determine that the second data does not include a valid WLAN frame, wherein the second data comprises second I/Q sample values;
determine that the first primary channel comprises a second interference signal signature via application of frequency domain analysis on the second I/Q sample values;
determine that a second secondary channel of the plurality of secondary channels does not comprise interference signals; and
cease data transmission using the first primary channel and instead using the second secondary channel for data transmission.

5. The WAP device of claim 4, wherein the WAP device is further to:
receive third data over a period of time;
generate third I/Q sample values via sampling the second data;
determine that the third I/Q sample values received via the first primary channel are free of interference signals;
cease data transmission using the second secondary channel and instead using the first primary channel again for data transmission; and
transmit, via in channel switch announcement (CSA) frames to the second WAP device, a command to switch back to using the first primary channel for data transmission.

6. The WAP device of claim 1, wherein the I/Q sample values are Fast Fourier transform (FFT) values, and wherein the WAP device is to further detect a radar pulsed pattern using the FFT values based on a combination of detected pulse width, amplitude, and a frequency spread of pulses within the radar pulsed pattern.

7. The WAP device of claim 1, wherein the WAP device has a first medium access control (MAC) address and the second WAP device has a second MAC address, which is higher than the first MAC address, and wherein the WAP device is further to, in response to the WAP device and the second WAP device detecting interference signals contemporaneously:
receive, from the second WAP device, a message comprising information that the second WAP device has detected interference signals on the first primary channel and first values of received signal strength information (RSSI) associated with the first primary channel on the second WAP device;
determine, based on the message and on second values of RSSI information received via the first primary channel on the WAP device, a third frequency range of the communication link bandwidth, wherein the third frequency range is less than the second frequency range and excludes the first primary channel;

determine that a second secondary channel of the plurality of secondary channels within the operating channel bandwidth does not comprise interference signals; and communicate, to the second WAP device, the third frequency range and a command to cease data transmission using the first primary channel and instead using the second secondary channel for data transmission.

8. The WAP device of claim 1, wherein the WAP device is further to:

transmit, to a server, information comprising at least one of historic interference event data, channel congestion data, or application-based throughput and latency requirements associated with the plurality of secondary channels;

receive, from the server, a bandwidth selection priority list developed by the server based on the information; and establish the communication link bandwidth with the first frequency range that is identical to or lower than the operating channel bandwidth and is consistent with the bandwidth selection priority list received from the server.

9. The WAP device of claim 8, wherein the WAP device is further to:

receive, from the server, a primary channel priority list that was developed based on the information; and establish the first primary channel using the primary channel priority list.

10. A method comprising:

establishing, by a first wireless access point (WAP) device, a communication link with a second WAP device on a first primary channel using a wireless local area network (WLAN) protocol, the communication link having an operating channel bandwidth and a communication link bandwidth, wherein the operating channel bandwidth comprises the first primary channel and a plurality of secondary channels, and the communication link bandwidth comprises a frequency range identical to or lower than a frequency range of the operating channel bandwidth, wherein the communication link bandwidth also includes at least the first primary channel;

receiving, by the first WAP device, first data via the communication link;

determining, by the first WAP device, that the first data does not include a valid WLAN frame, wherein the first data comprises in-phase and quadrature (I/Q) sample values;

determining, by the first WAP device, using the I/Q sample values, that a first secondary channel of the plurality of secondary channels comprises an interference signal signature; and modifying, by the first WAP device, the communication link bandwidth from a first frequency range of the operating channel bandwidth to a second frequency range that is lower than the first frequency range, wherein the second frequency range includes the first primary channel and does not include the first secondary channel.

11. The method of claim 10, further comprising:

transmitting, by the first WAP device to the second WAP device, a message comprising information (i) that the communication link bandwidth has been set to the second frequency range and (ii) about a frequency of the interference signal signature on the first secondary channel; and communicating, by the first WAP device with the second WAP device using only the second frequency range.

12. The method of claim 10, further comprising:

receiving, by the first WAP device, second data over a period of time;

generating, by the first WAP device, second I/Q sample values via sampling the second data;

determining, by the first WAP device, that the second I/Q sample values received via the first secondary channel are free of interference signals; and setting, by the first WAP device, the communication link bandwidth back to the first frequency range.

13. The method of claim 10, further comprising:

receiving, by the first WAP device, second data via the operating channel bandwidth of the communication link;

determining, by the first WAP device, that the second data does not include a valid WLAN frame, wherein the second data comprises second I/Q sample values;

determining, by the first WAP device, that the first primary channel comprises a second interference signal signature via application of frequency domain analysis on the second I/Q sample values;

determining, by the first WAP device, that a second secondary channel of the plurality of secondary channels does not comprise interference signals; and ceasing, by the first WAP device, data transmission using the first primary channel and instead using, by the first WAP device, the second secondary channel for data transmission.

14. The method of claim 13, further comprising:

receiving, by the first WAP device, third data over a period of time;

generating, by the first WAP device, third I/Q sample values via sampling the second data;

determining, by the first WAP device, that the third I/Q sample values received via the first primary channel are free of interference signals;

ceasing, by the first WAP device, data transmission using the second secondary channel and instead using the first primary channel again for data transmission; and transmitting, by the first WAP device via in channel switch announcement (CSA) frames to the second WAP device, a command to switch back to using the first primary channel for data transmission.

15. The method of claim 10, wherein the I/Q sample values are Fast Fourier transform (FFT) values, the method further comprising detecting, by the first WAP device, a radar pulsed pattern using the FFT values based on a combination of detected pulse width, amplitude, and a frequency spread of pulses within the radar pulsed pattern.

16. The method of claim 10, wherein the first WAP device has a first medium access control (MAC) address and the second WAP device has a second MAC address, which is higher than the first MAC address, the method further comprising, in response to the first WAP device and the second WAP device detecting interference signals contemporaneously:

receiving, by the first WAP device from the second WAP device, a message comprising information that the second WAP device has detected interference signals on the first primary channel and first values of received signal strength information (RSSI) associated with the first primary channel on the second WAP device;

determining, by the first WAP device based on the message and on second values of RSSI information received via the first primary channel on the first WAP device, a third frequency range of the communication link bandwidth, wherein the third frequency range is less than the second frequency range and excludes the first primary channel;

determining, by the first WAP device, that a second secondary channel of the plurality of secondary channels within the operating channel bandwidth does not comprise interference signals; and communicating, by the first WAP device to the second WAP device, the third frequency range and a command to cease data transmission using the first primary channel and instead using the second secondary channel for data transmission.

17. The method of claim 10, further comprising:

transmitting, by the first WAP device to a server, information comprising at least one of historic interference event data, channel congestion data, or application-based throughput and latency requirements associated with the plurality of secondary channels;

receiving, by the first WAP device from the server, a bandwidth selection priority list developed by the server based on the information; and establishing, by the first WAP device, the communication link bandwidth with the first frequency range that is identical to or lower than the operating channel bandwidth and is consistent with the bandwidth selection priority list received from the server.

18. The method of claim 17, further comprising:

receiving, by the first WAP device from the server, a primary channel priority list that was developed based on the information; and establishing, by the first WAP device, the first primary channel using the primary channel priority list.

19. A wireless mesh network comprising:

a first wireless access point (WAP) device; and a second WAP device to:

establish a communication link with the first WAP device on a first primary channel using a wireless local area network (WLAN) protocol, the communication link having an operating channel bandwidth and a communication link bandwidth, wherein the operating channel bandwidth comprises the first primary channel and a plurality of secondary channels, and the communication link bandwidth comprises a frequency range identical to or lower than a frequency range of the operating channel bandwidth, wherein the communication link bandwidth also includes at least the first primary channel;

receive, from the first WAP device, first data via the communication link;

determine that the first data does not include a valid WLAN frame, wherein the first data comprises in-phase and quadrature (I/Q) sample values;

determine, using the I/Q sample values, that a first secondary channel of the plurality of secondary channels comprises an interference signal signature; and modify the communication link bandwidth from a first frequency range of the operating channel bandwidth to a second frequency range that is lower than the first frequency range, wherein the second frequency range includes the first primary channel and does not include the first secondary channel.

20. The wireless mesh network of claim 19, wherein the second WAP device is further to:

transmit, to the first WAP device, a message comprising information (i) that the communication link bandwidth has been set to the second frequency range and (ii) about a frequency of the interference signal signature on the first secondary channel; and communicate with the first WAP device using only the second frequency range.

* * * * *